Figure 1:
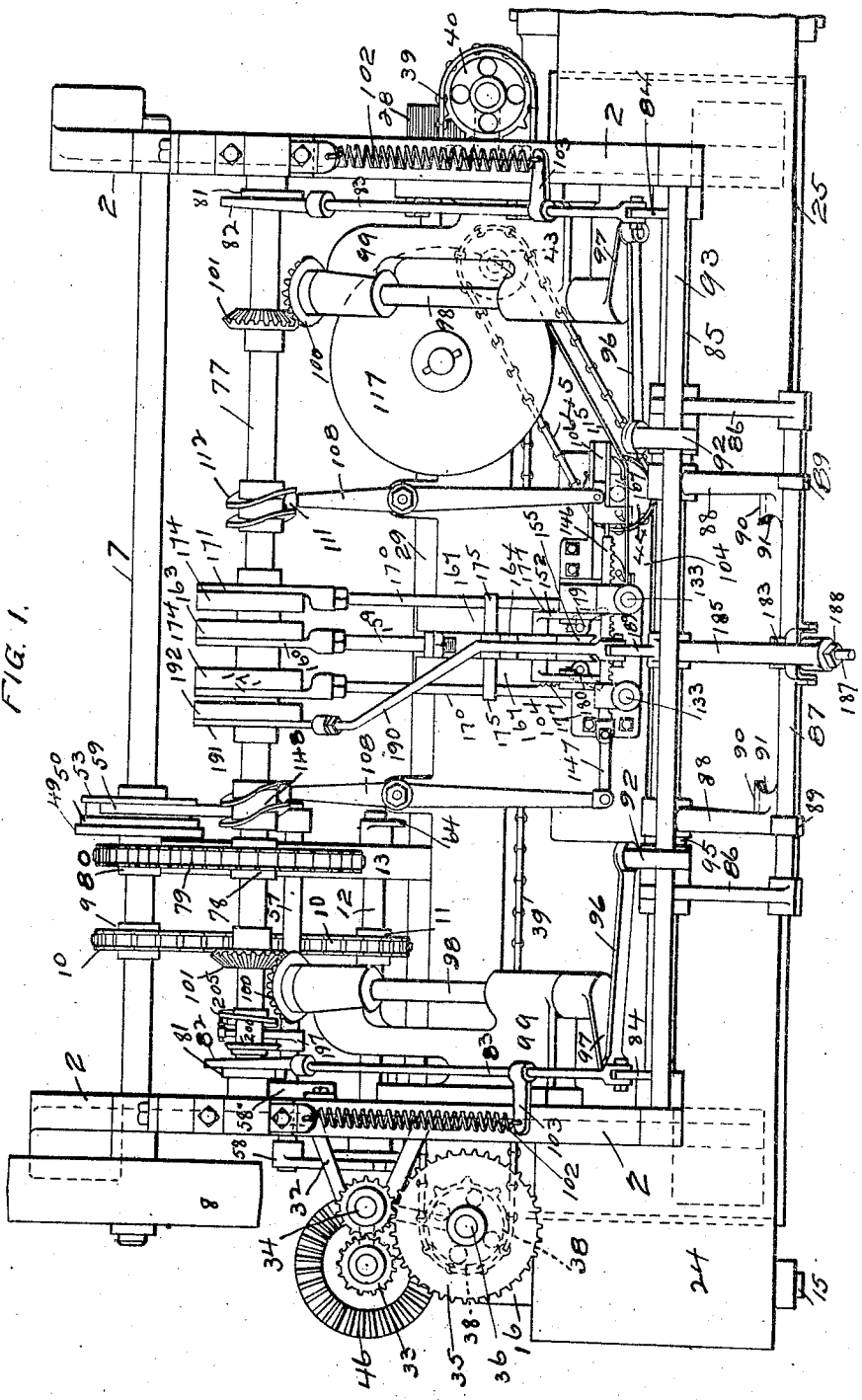

No. 819,466. PATENTED MAY 1, 1906.
E. G. STAUDE.
SACK FOLDING AND SECURING MACHINE.
APPLICATION FILED JUNE 20, 1903.
15 SHEETS—SHEET 1.

Witnesses
O. G. Hanson
E. V. Griffin

Inventor
Edwin G. Staude
By Paul Powel
His Attorneys.

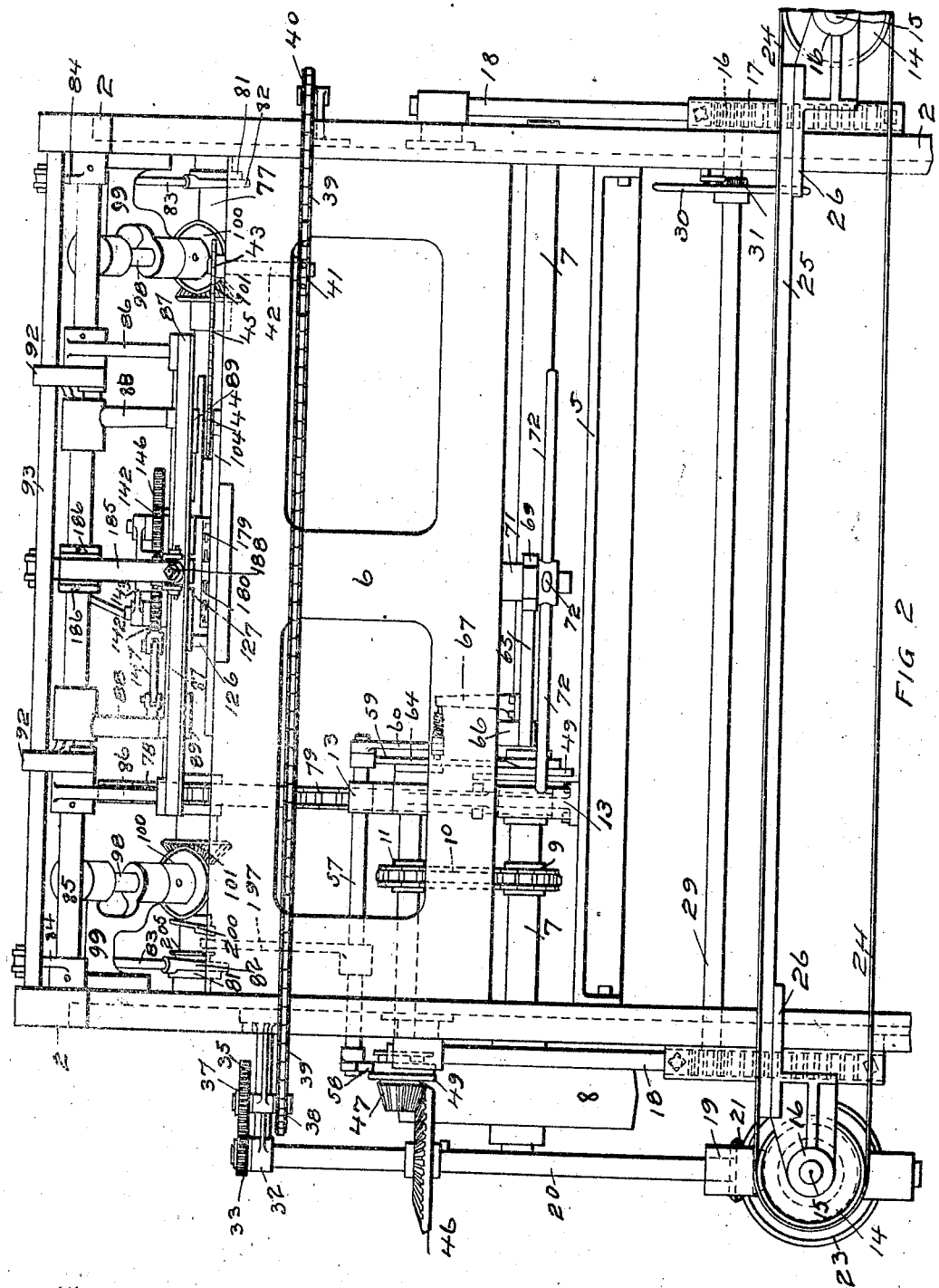

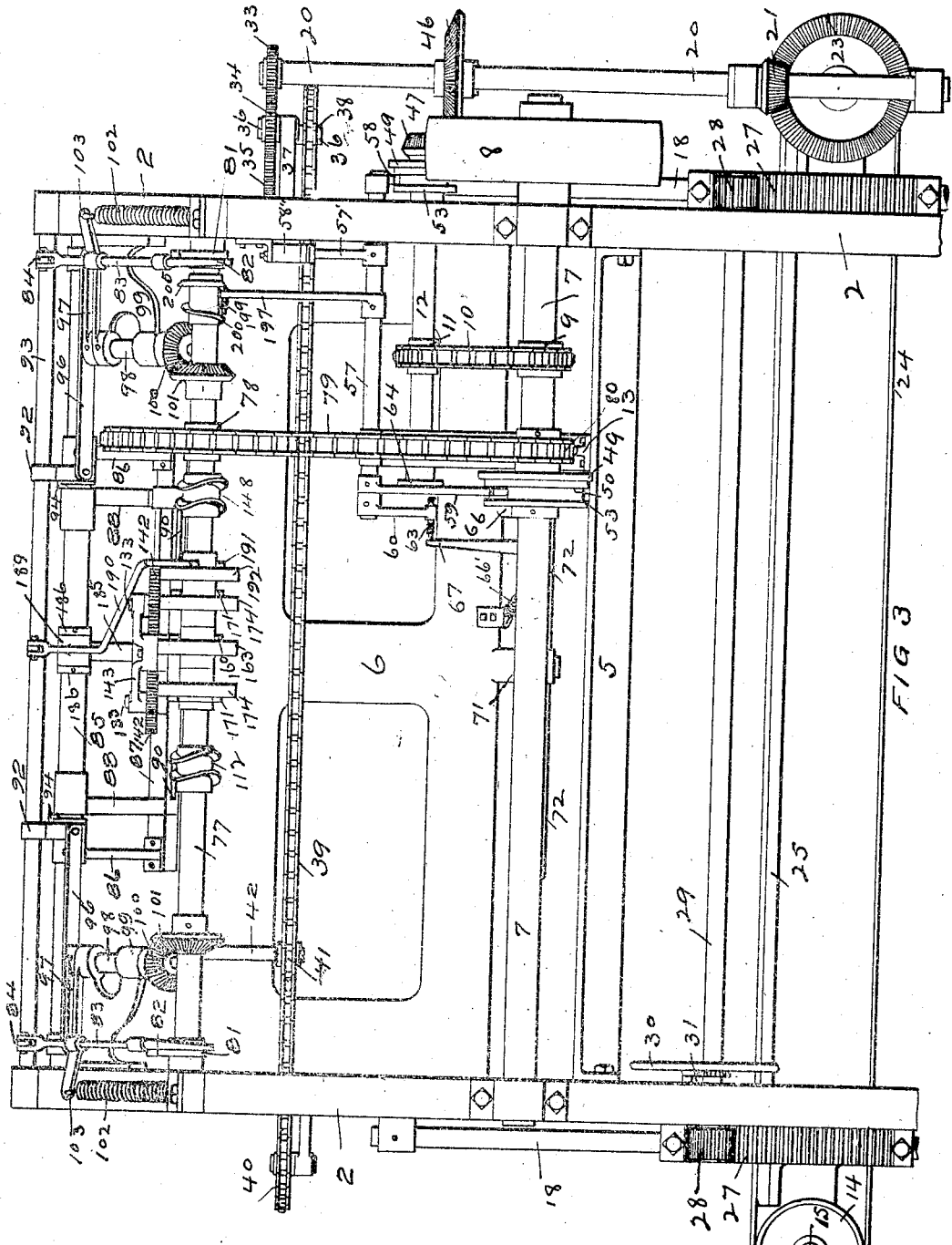

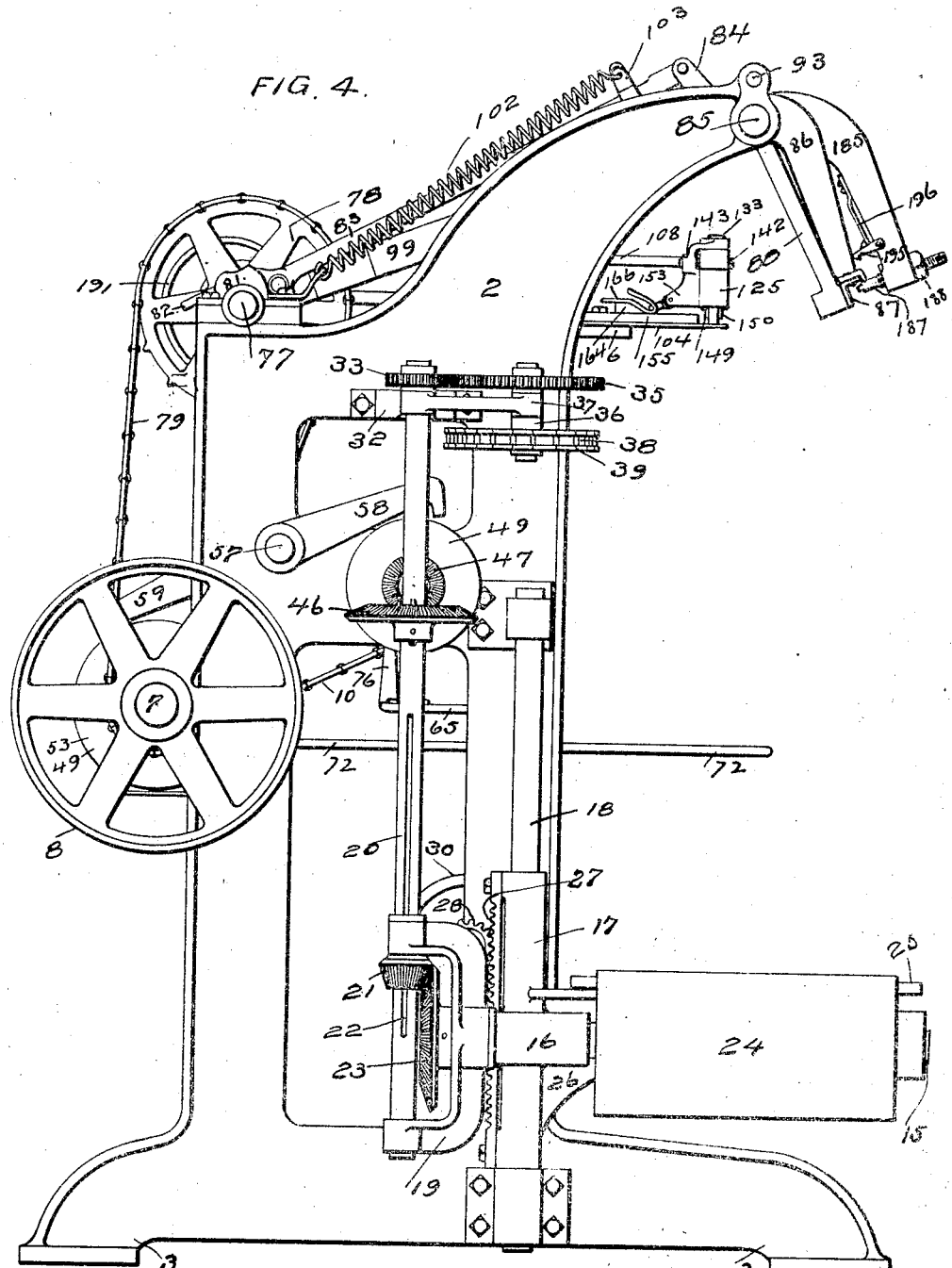

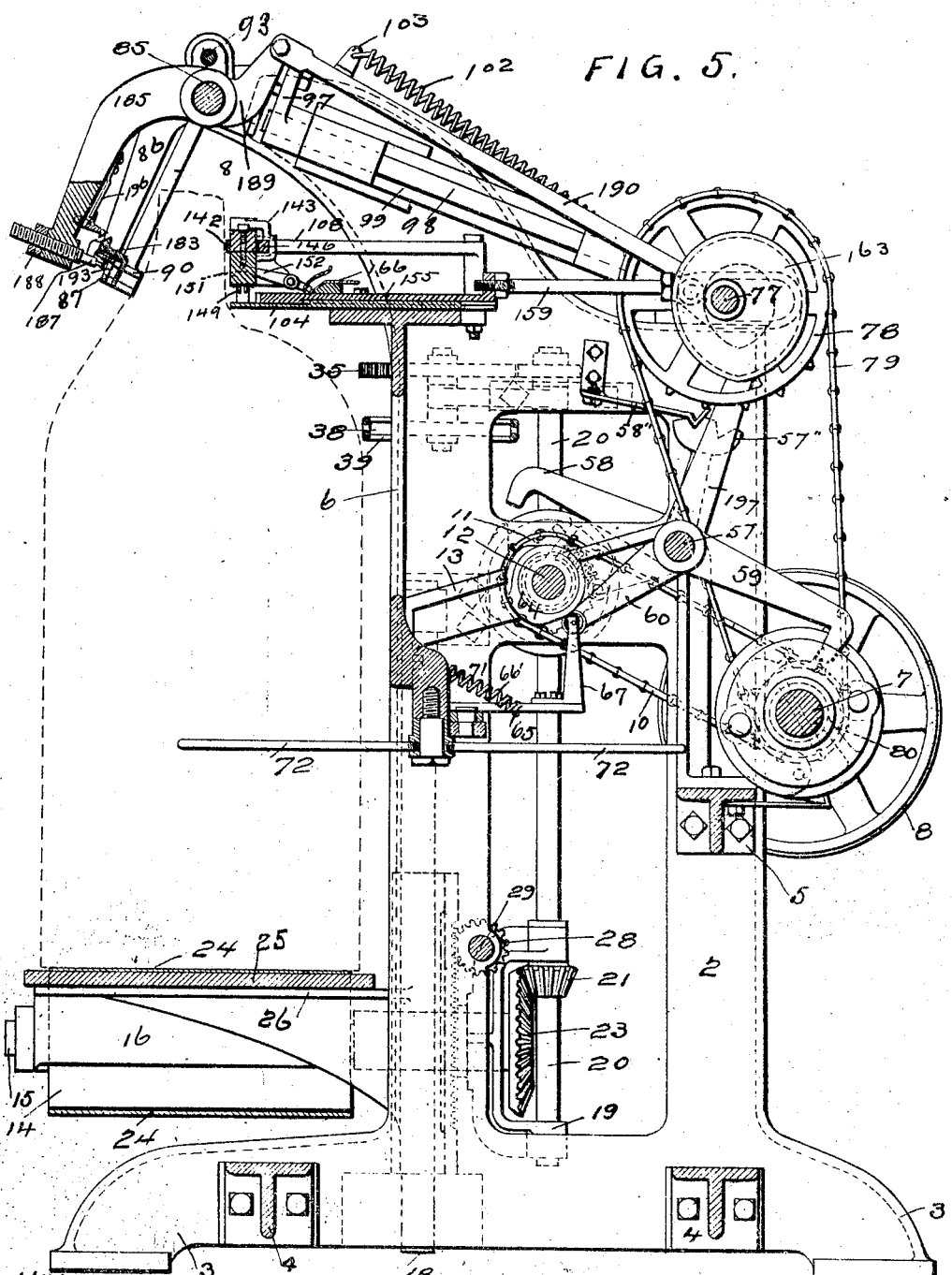

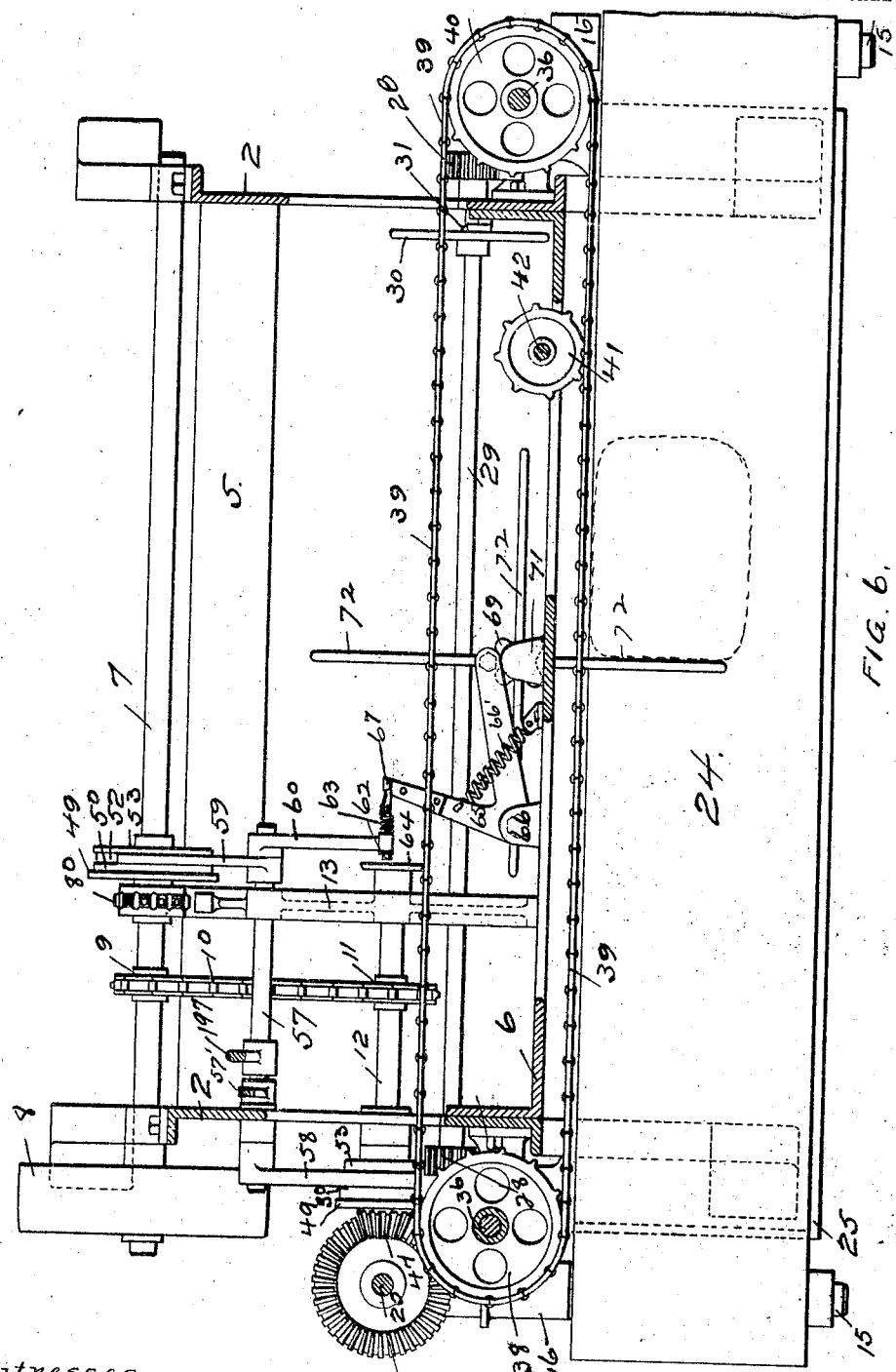

No. 819,466. PATENTED MAY 1, 1906.
E. G. STAUDE.
SACK FOLDING AND SECURING MACHINE.
APPLICATION FILED JUNE 20, 1903.
15 SHEETS—SHEET 7.
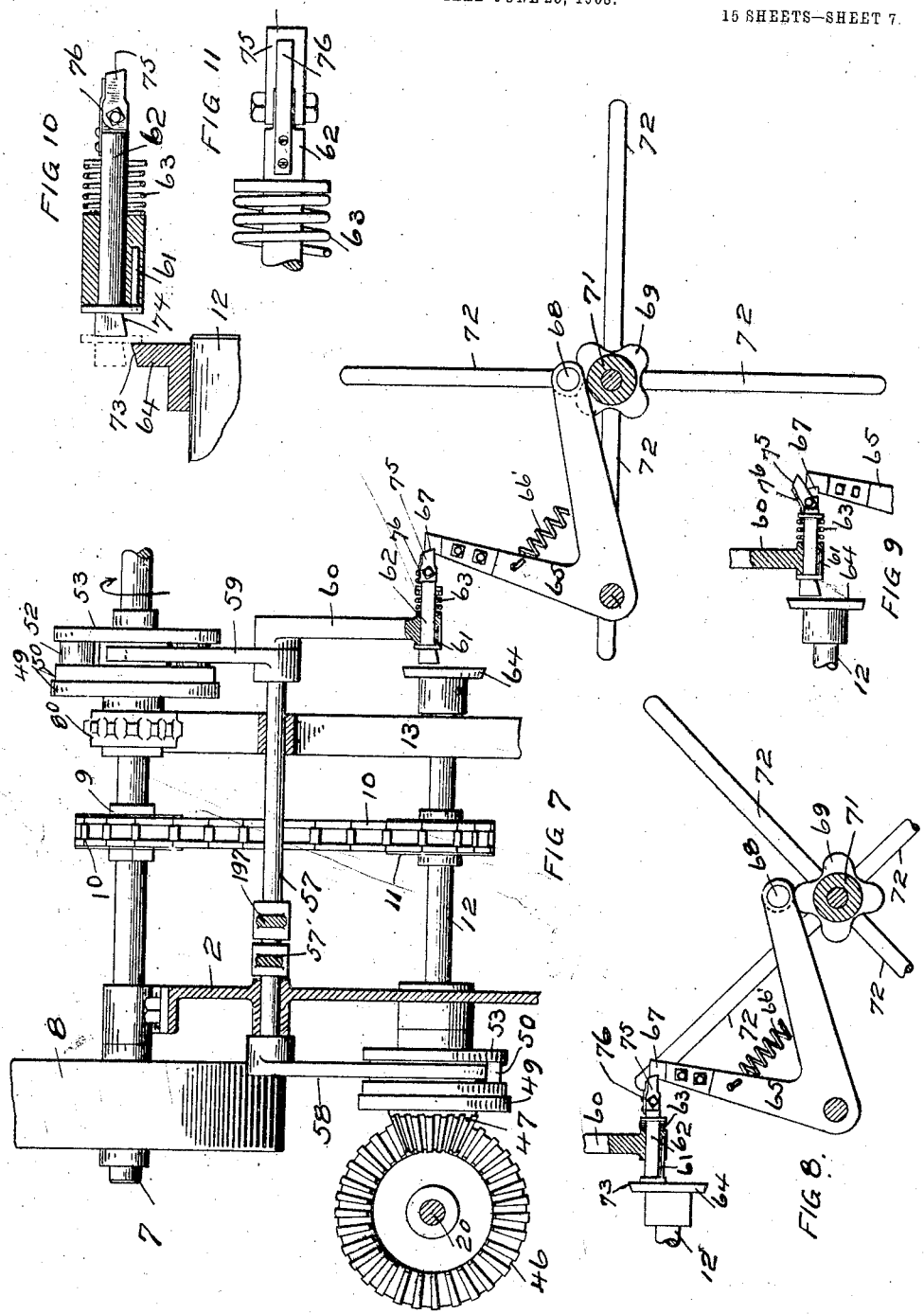
Witnesses
Inventor
Edwin G. Staude
By Paul Paul
his attorneys.

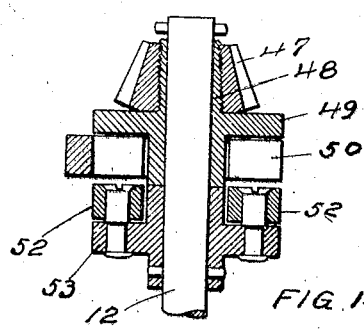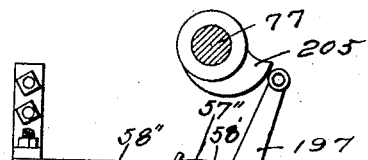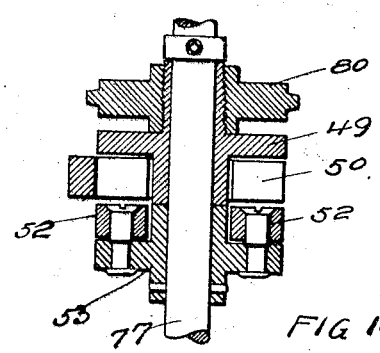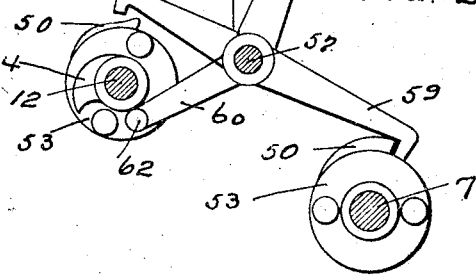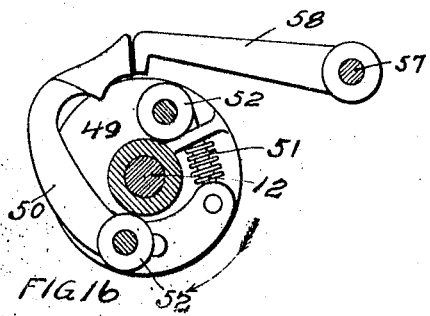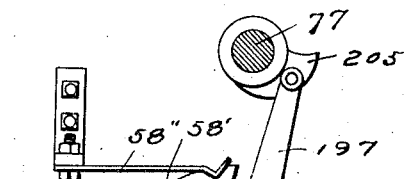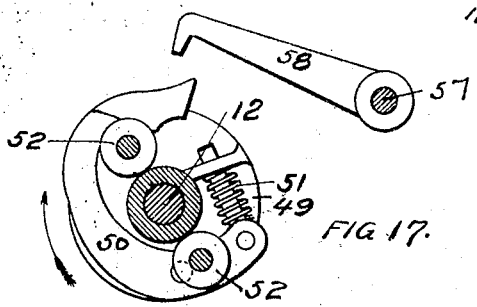

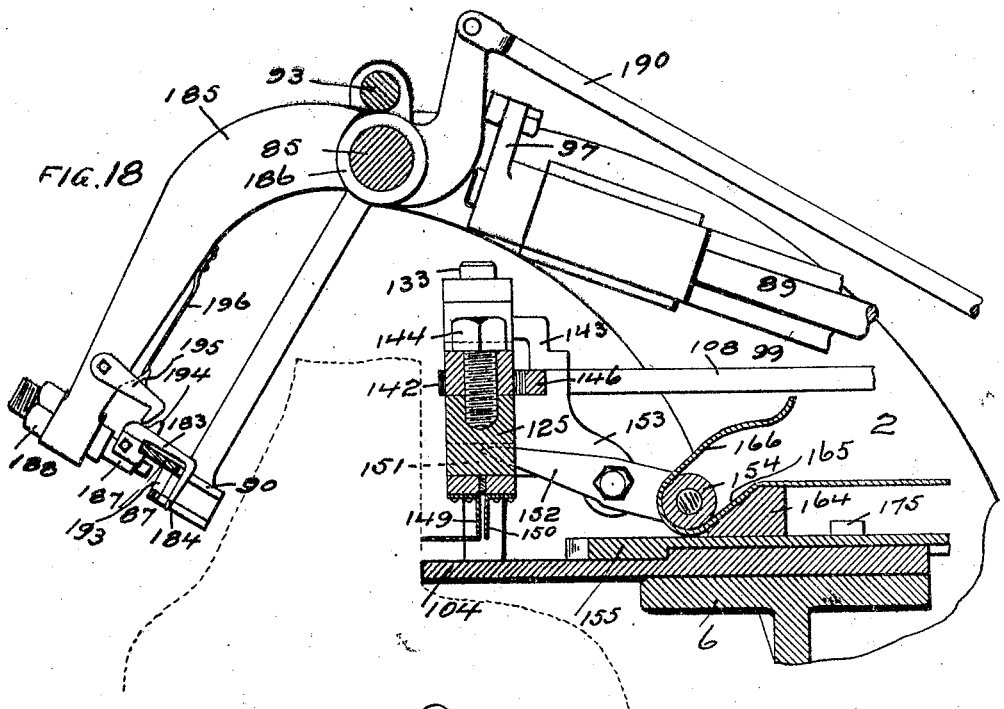
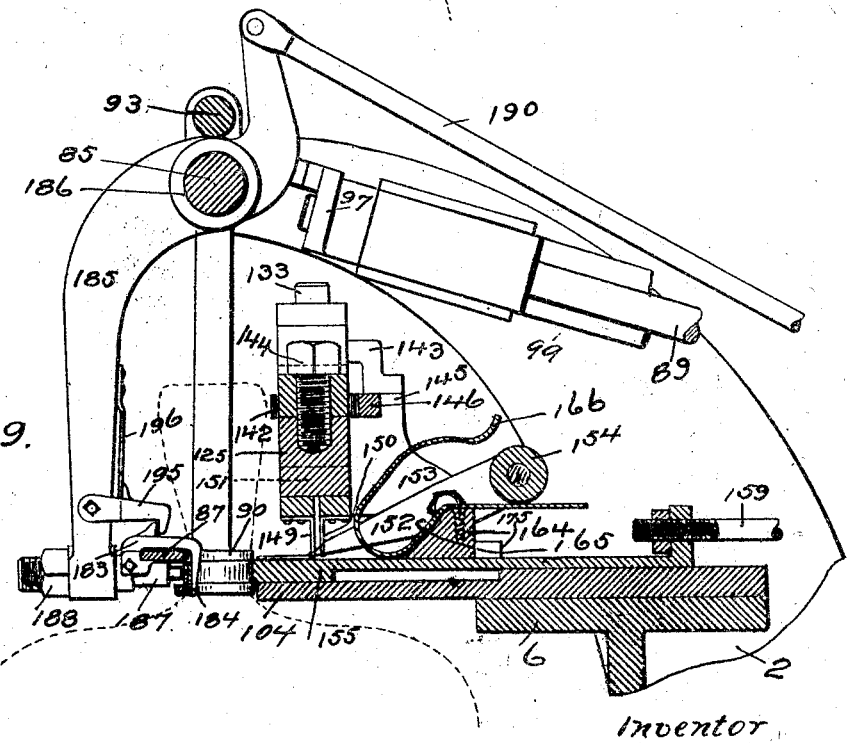

No. 819,466. PATENTED MAY 1, 1906.
E. G. STAUDE.
SACK FOLDING AND SECURING MACHINE.
APPLICATION FILED JUNE 20, 1903.

15 SHEETS—SHEET 10.

Witnesses.
C. G. Hanson
S. V. Griffin

Inventor
Edwin G. Staude
By Paul & Paul
His attorneys

No. 819,466. PATENTED MAY 1, 1906.
E. G. STAUDE.
SACK FOLDING AND SECURING MACHINE.
APPLICATION FILED JUNE 20, 1903.
15 SHEETS—SHEET 11.

Witnesses
C. G. Hanson.
S. V. Griffin

Inventor
Edwin G. Staude
By Paul & Paul
his attorneys.

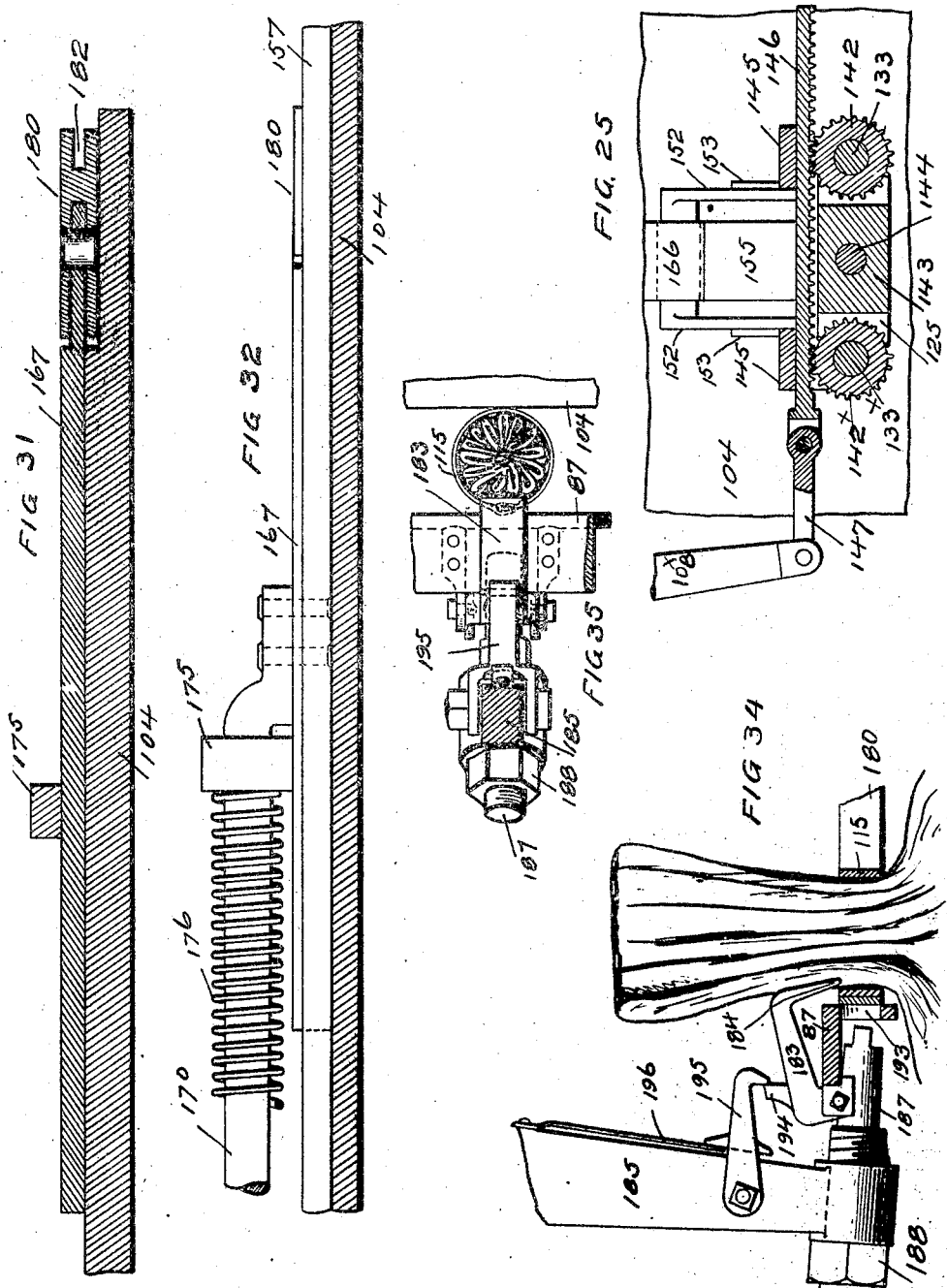

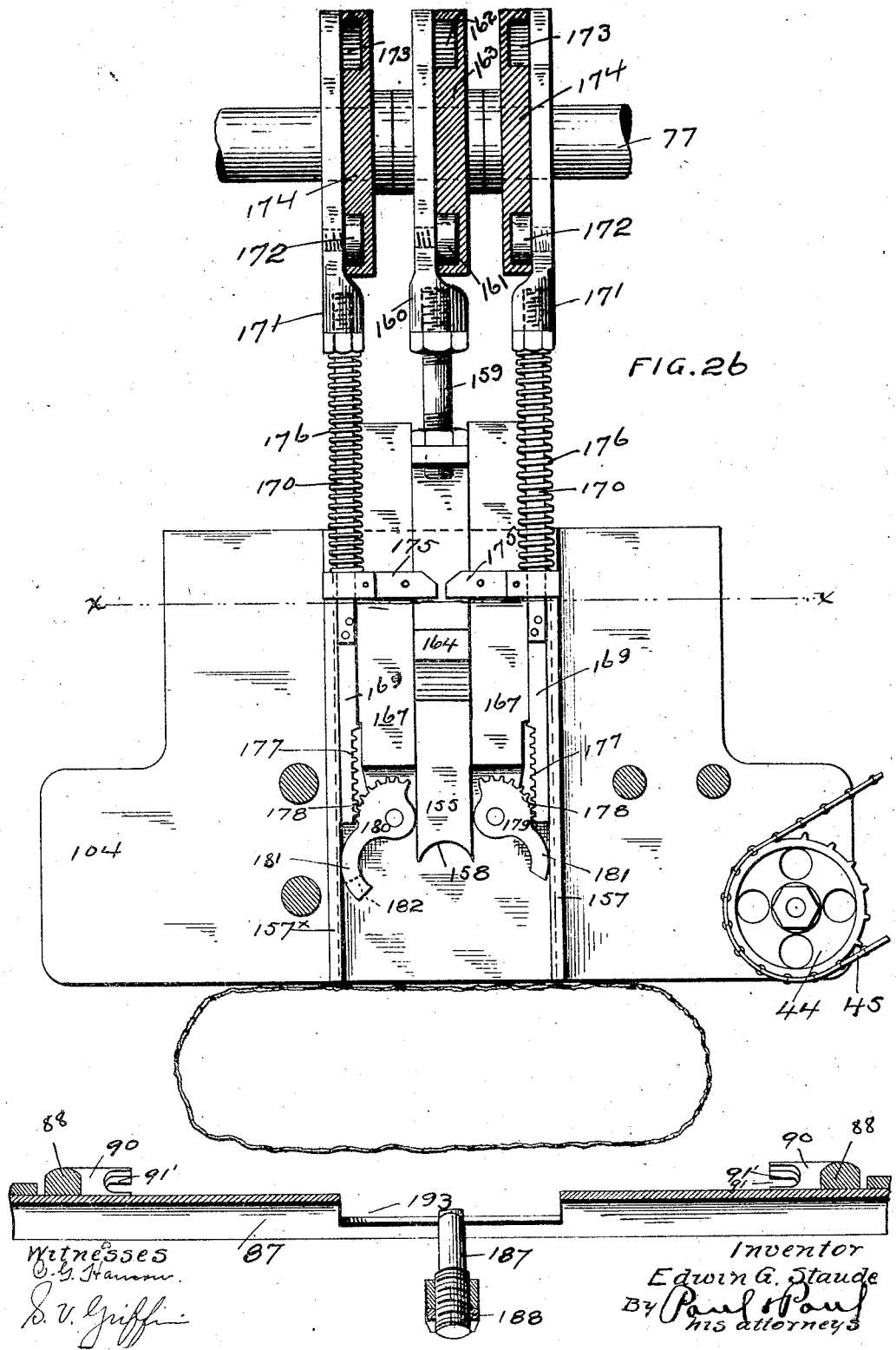

No. 819,466. PATENTED MAY 1, 1906.
E. G. STAUDE.
SACK FOLDING AND SECURING MACHINE.
APPLICATION FILED JUNE 20, 1903.
15 SHEETS—SHEET 14.
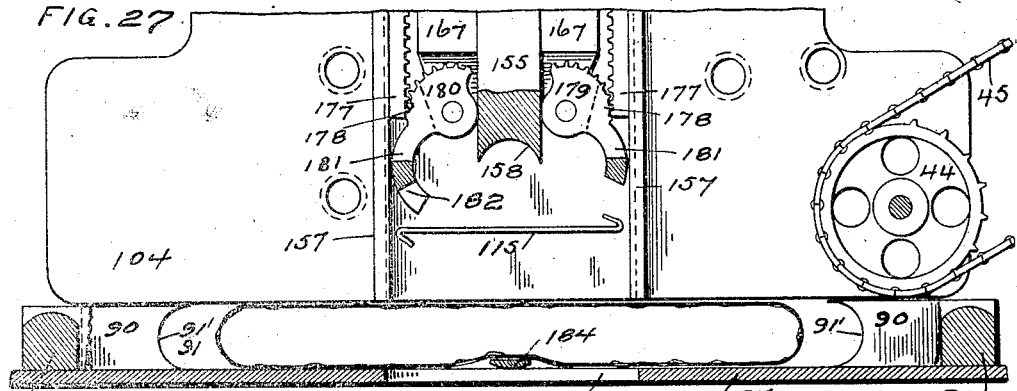
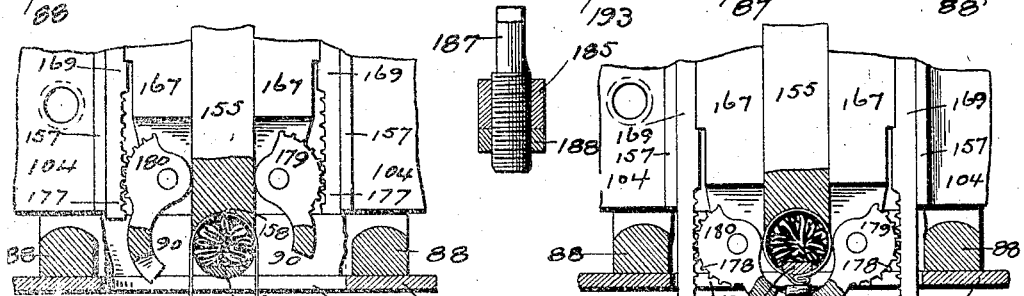
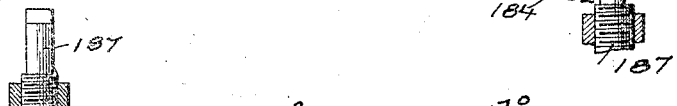
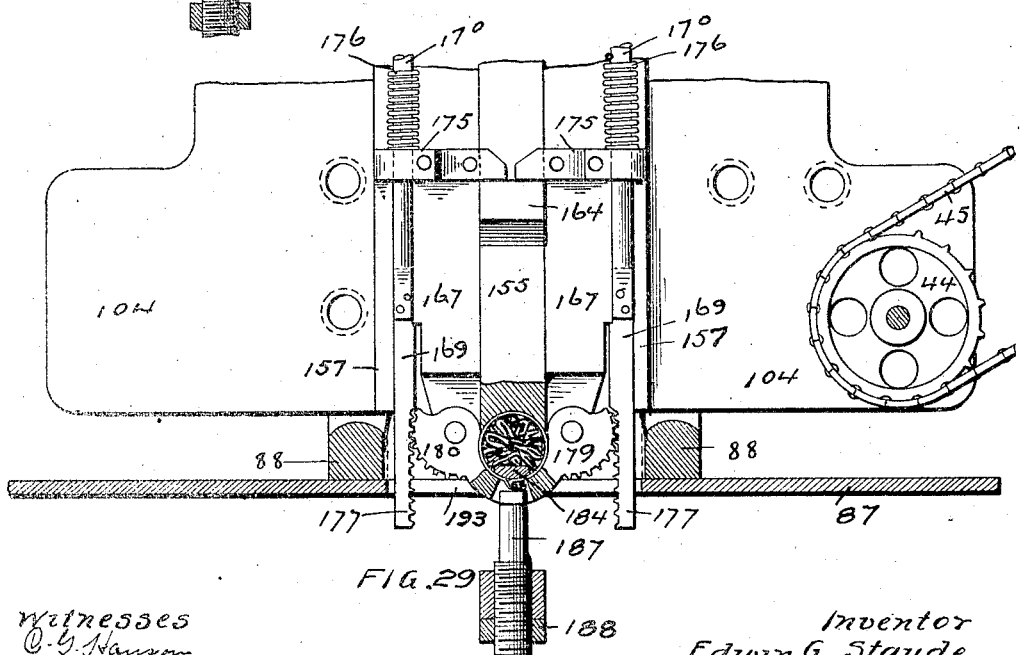
Witnesses
Inventor
Edwin G. Staude
By Paul & Paul
his attorneys.

No. 819,466. PATENTED MAY 1, 1906.
E. G. STAUDE.
SACK FOLDING AND SECURING MACHINE.
APPLICATION FILED JUNE 20, 1903.
15 SHEETS—SHEET 15.
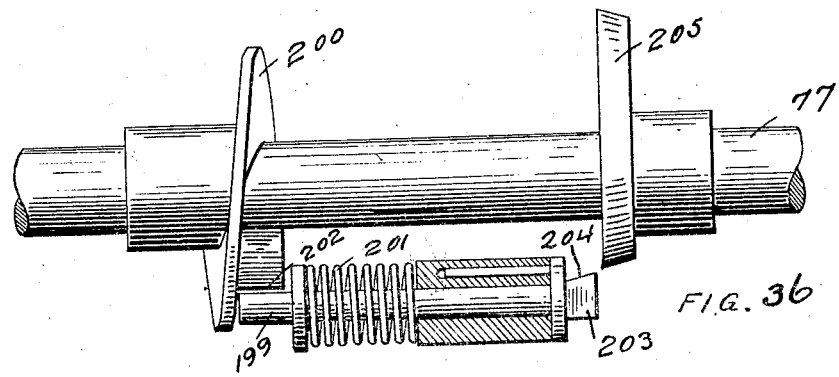
FIG. 36
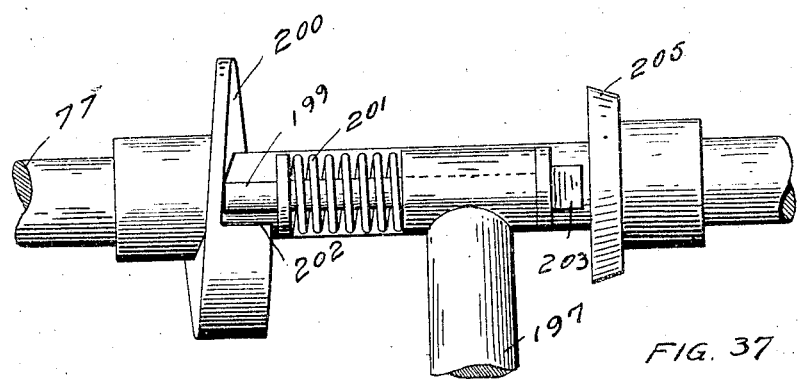
FIG. 37
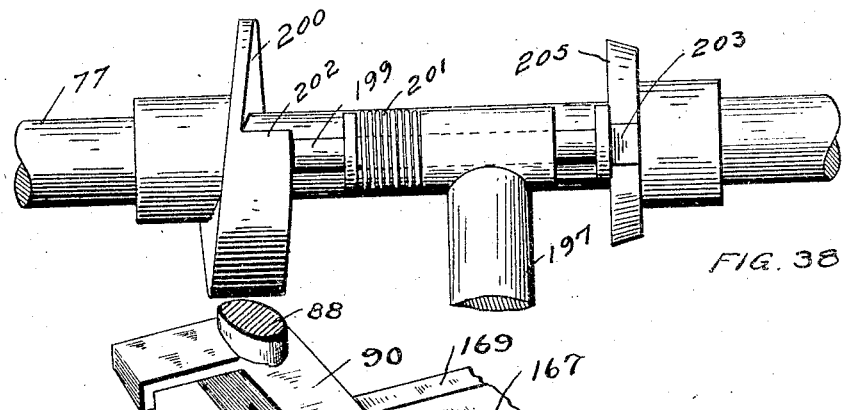
FIG. 38
FIG. 21a
Witnesses
C. G. Hausm.
S. V. Griffin
Inventor
Edwin G. Staude
By Paul & Paul
his attorneys.

UNITED STATES PATENT OFFICE.

EDWIN G. STAUDE, OF MINNEAPOLIS, MINNESOTA.

SACK FOLDING AND SECURING MACHINE.

No. 819,466.

Specification of Letters Patent.

Patented May 1, 1906.

Application filed June 20, 1903. Serial No. 162,357.

*To all whom it may concern:*

Be it known that I, EDWIN G. STAUDE, of Minneapolis, Hennepin county, Minnesota, have invented certain new and useful Improvements in Sack Folding and Securing Machines, of which the following is a specification.

In the operation of a flour-mill it has been customary heretofore after sacking the flour or other mill product to gather or pucker the mouths or open ends of the sacks, particularly those made of paper, and tie them securely with strings, a tedious and laborious task and one involving the necessary employment of a number of men.

The object of my invention is to provide means for closing and securing the open tops of filled sacks, particularly those of paper, which on account of their stiffer character can be more conveniently gathered and secured mechanically than those of cloth, to the end that the use of strings may be entirely avoided, the number of men employed in handling the sacks reduced, and the fixed expenses of sacking flour or other mill product correspondingly decreased.

Other objects of the invention will appear from the following detailed description.

The invention consists generally in an improved sack-feeding mechanism.

Further, the invention consists in means for forming vertical folds in the top of the sack.

Further, the invention consists in an improved clamp or fastener forming means.

Further, the invention consists in means for bending the clamp around the folded portion of the sack.

Further, the invention consists in means for clenching the interlocked ends of the fastener or clamp; and, further, the invention consists in various constructions and combinations, all as hereinafter described, and particularly pointed out in the claims.

Figure 20:
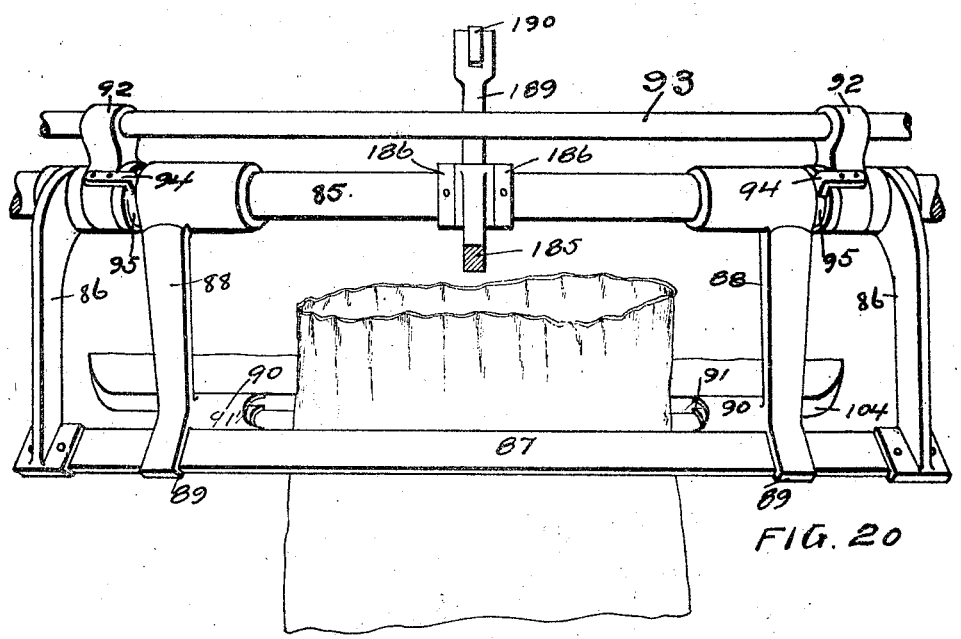
Figure 21:
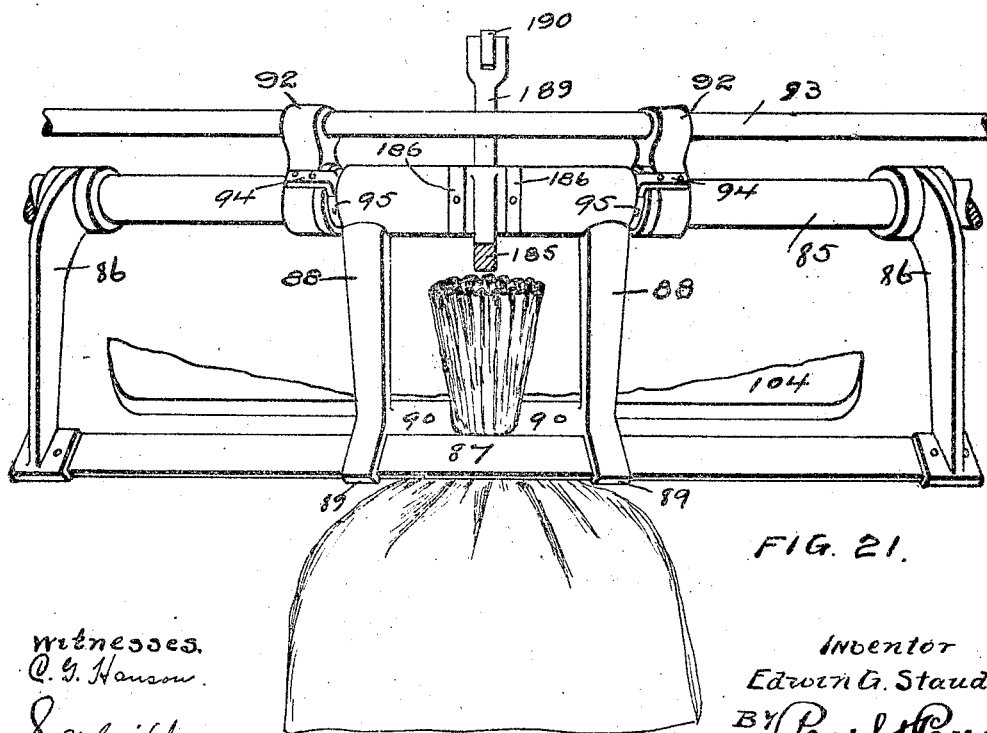
Figure 22:
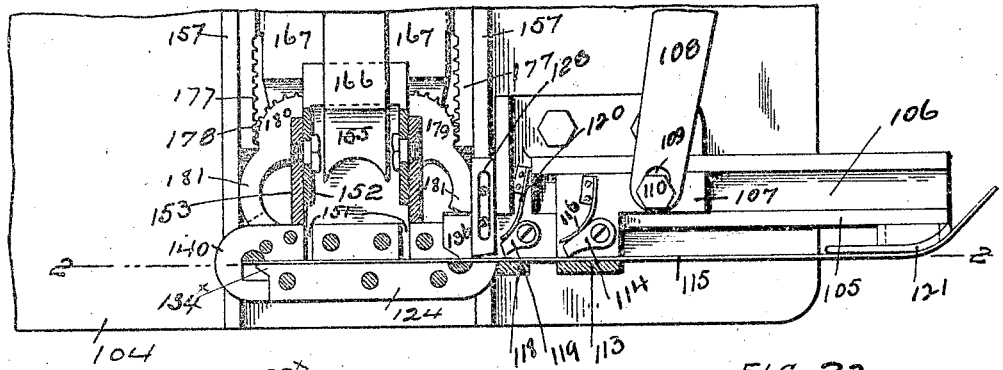
Figure 23:
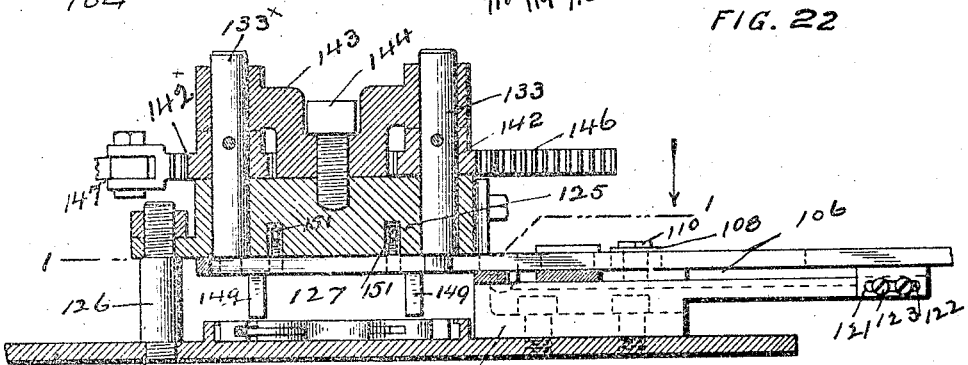
Figure 24:
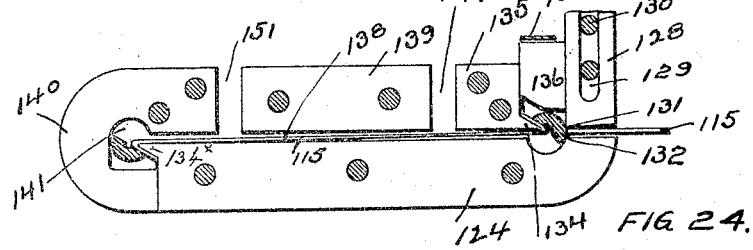
Figure 33:
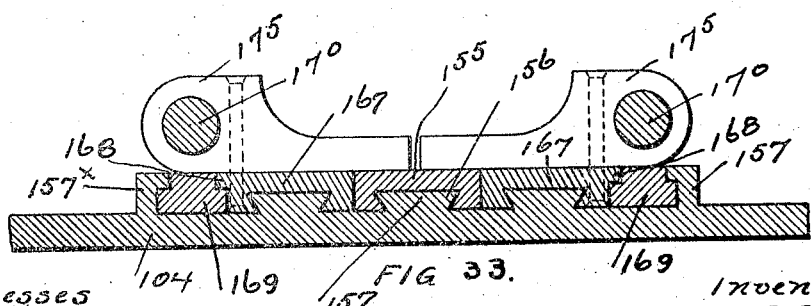

In the accompanying drawings, forming part of this specification, Figure 1 is a plan view of a sack closing and securing machine embodying my invention. Fig. 2 is a front elevation of the same. Fig. 3 is a rear elevation of the same. Fig. 4 is an end elevation showing the mechanism for operating the sack-conveyer. Fig. 5 is a vertical transverse section showing the clutch-locking hooks and the mechanism for operating the same. Fig. 6 is a plan section showing the mechanism for operating the shifter mechanism and stopping the feed. Fig. 7 is a detail view of the same on an enlarged scale. Figs. 8, 9, 10, and 11 are details of the turnstile and bell-crank-lever mechanism that is actuated by the traveling sack to stop the feed mechanism when the sack reaches a certain predetermined point. Figs. 12 and 13 are details of the hook mechanisms for operating the clutches on the driving, feed, and cam shafts. Figs. 14 and 15 are sections, respectively, of the clutches on the feed and driving shafts. Figs. 16 and 17 are side views of Fig. 14, showing the locked and unlocked positions. Figs. 18 and 19 are detail sectional views of the mechanism for flattening the open end of the sack, forcing the finished clamp out of the head, and clenching the hooked ends of the fastener around the sack. Figs. 20 and 21 are detail views showing the bar for flattening the top of the sack and the sack-folders that engage the flattened top at its sides to form the gathers or vertical folds in the same. Fig. 21ᵃ is a detail view showing one of the bag-folders and one of the clamp-folders in their closed position. Fig. 22 is a plan section taken on the line 1 1 on Fig. 23. Fig. 23 is a vertical section taken on the line 2 2 of Fig. 22. Fig. 24 is an enlarged view of a portion of Fig. 22, showing the rotating knives in the act of bending the ends of the clamp. Fig. 25 is a detail section showing the mechanism for rotating the studs whereon the clamp-bending knives are arranged. Fig. 26 is a plan view, partially in section, showing the mechanism for bending the clamp around the mouth of the sack. Figs. 27, 28, 29, and 30 are detail sectional views showing the successive steps in the operation of bending the clamp, folding its ends around the contracted ends of the sack, and clenching the hooked ends of the clamp together. Fig. 31 is a section showing the manner of securing the clamp-folder to its operating-bar. Fig. 32 is a longitudinal section through the plate, showing the connection between the rack-bar-operating rod and the supporting-bar for the clamp-folder. Fig. 33 is a transverse section through the clamp-folding mechanism and the plate whereon the same is supported substantially on the line $x\ x$ of Fig. 26. Fig. 34 is a detail showing the mechanism for disengaging the anvil-hook from between the clenched ends of the clamp and the sack after the fastener has been put in place. Fig. 35 is a plan view of the same. Figs. 36, 37, and 38 are detail views of the shifter mechanism for reversing the movement of the swinging hooks to release the clutch on the cam-shaft and lock the corresponding clutch on the feed-shaft after each revolution of the former.

*The machine-frame.*—In the drawings, Figs. 1 to 6 particularly, I have shown a suitable supporting-frame for the mechanism consisting of ends 2, having spreading feet 3, connected by bars 4, that are substantially T-shaped in cross-section, and by a similar bar 5, that is preferably arranged at the rear of the machine about midway between the top and bottom of the same. The front of the machine is partially closed by a panel 6, extending horizontally from end to end thereof. This machine-frame is preferably of metal, and the parts are rigidly bolted together to form a stiff substantial support for the feeding, folding, and fastening mechanisms. A driving-shaft 7 is mounted in bearings in the rear of the frame and is provided with a driven pulley 8. A sprocket 9 is secured on said shaft connected by a chain 10 with a similar sprocket 11 on the feed-shaft 12, which runs continuously and is supported in bearings in the end of the frame and in a bracket or bridge 13. (See Figs. 1, 2, and 3.)

*The feed mechanism.*—This part of the machine is shown also in Figs. 1 to 6 and consists of rolls 14, provided at the front of the machine near each end and mounted on shafts 15, which extend beyond the rolls at their inner ends and have bearings 16 in castings 17. These castings are vertically slidable on rods 18, secured at their ends to the machine-frame. A yoke 19, secured on the shaft 15 at one end of the machine, is slidably mounted on an upright shaft 20 and carries a pinion 21, that is slidable in a keyway 22 in said shaft and is adapted to engage a beveled gear 23 on the shaft 15, Fig. 4. An endless conveyer-belt 24 connects the rolls 14 and is adapted to travel over a flat table 25, supported on brackets 26, which also have bearings for the outer ends of the roll-shafts, Fig. 2. The castings 17 at each end of the machine have racks 27, that are engaged by pinions 28 on a shaft 29, that is mounted in bearings in said frame and has near one end a wheel 30 and a ratchet 31, Fig. 2. The operation of the wheel 30 will revolve the shaft 29 and raise or lower the castings 17, according to the direction in which the wheel is turned, the castings slipping freely on the rods 18, and the pinion 21 slipping in the keyway in the shaft 20.

The sacks to be folded and fastened are stood on end on the conveyer-belt 14 at the receiving end thereof and the raising and lowering mechanism above described allows the operator to adjust the height of the conveyer, according to the size of the sack that it is desired to close, the larger sacks of course being higher and requiring a lower adjustment of the conveyer than those of smaller size. The upper end of the shaft 20 has a suitable bearing in the bracket 32 on the machine-frame and is provided with a gear 33, meshing with a similar gear 34, which in turn drives a larger gear 35, mounted on a stud 36, supported in a bearing 37 and provided at its lower end with a sprocket 38, over which a chain 39 passes to a sprocket 40, mounted in a suitable bearing on the opposite end of the machine, Figs. 2 and 4. This chain travels horizontally, one half or section on the inside and the other on the outside of the panel 6 and above the inner edge of the conveyer-belt in position to engage the upper portion of the inner wall of the sack near the point where it is contracted by the vertical fold therein. (See Figs. 4 and 5.) I also prefer to provide a sprocket 41, engaging the outer section of the chain 40 and mounted on a vertical stud 42, that is provided at its upper end with a similar sprocket 43, connected with a sprocket 44 by a chain 45, Figs. 1, 6, and 26. This chain 45, as shown in Fig. 1, operates at an angle with respect to the feed-chain 39 and in a plane substantially parallel and above the same, Fig. 2, and its office is to engage the upper portion of the sack and direct the part to be folded toward the folding mechanism, and as both of these feed-chains will be in motion simultaneously with the conveyer-belt and at about the same speed the top and bottom of the sack will move together, and there will be no danger of the sack tipping over through coming in contact with a stationary portion of the machine. A beveled gear 46 is secured on the shaft 20, meshing with a pinion 47, that is secured on the threaded end 48 of a clutch member 49, that is loosely mounted on the feed-shaft 12, Figs. 2, 6, and 7. A dog 50 is pivoted at a point intermediate to its ends on the clutch member 49, and a spring 51, provided between the end of said dog and said clutch member 49, normally holds the opposite end of the dog in the path of rolls 52, provided on a cross-head 53, that is secured to the feed-shaft and revolves therewith, Fig. 14. When the dog is in engagement with the cross-head, the loosely-mounted clutch member 49 will be locked, and with it the pinion 47, and the revolution of said pinion will drive the gear 46, the upright shaft 20, and through the connecting mechanism (see Fig. 4) the conveyer-belt. Clutches similar to that above described are provided on the driving and cam shafts, and I have used the same reference-figures to designate the corresponding parts of all the clutches (Sheet 8) and shall refer to them hereinafter as the "driving," "feed" and "cam" shaft clutches. A shaft 57 (see Fig. 7) is mounted in said frame between the driving and feed shafts and provided at its outer end with a hook 58, that engages the end of the dog 50 of the member 49 to push it out of engagement with the cross-head 53 against the tension of its spring. A similar oppositely-projecting hook 59 is provided near the other end of the shaft 57 and is raised out of engagement with the dog on the driving-shaft clutch to allow said clutch to be locked when the hook 58 is depressed to unlock the feed-shaft clutch. An arm 60 is secured on the shaft 57 near the hook 59, extending toward the feed-shaft and having guides 61 for a sliding pin 62, that is normally held in a retracted position by a spring 63, Fig. 7. A cam 64 is secured on the end of the feed-shaft 12 near the pin 62, into the path of which cam the end of said pin is moved when the spring 63 is compressed, the engagement of said cam with said pin causing the oscillation of the arm 60 and a corresponding movement of the shaft 57 and the hooks 58 and 59. To prevent premature movement of the shaft 57, I prefer to provide an arm 57' thereon having a head 57'', that has notches 58' to receive a spring 58'' secured on the machine-frame, Figs. 12 and 13.

A bell-crank 65 is mounted on a bracket 66, and one arm of said bell-crank has secured thereon a finger 67, having a notched end to engage the end of the pin 62, while the opposite arm of said bell-crank is provided with a roller 68, that travels on the edge of a cam 69, rotatably secured on a bracket 71 and having a series of radiating arms 72, which project horizontally and are engaged and operated by the moving sacks, Figs. 5, 6, and 7. The roller 68 is held in engagement with the cam 69 by a spring 66'. This cam and the arms thereon act as a turnstile, there being preferably four arms and a corresponding number of projections on the cam alternating with the arms. As the cam revolves and the projections thereon engage the roller 68 the bell-crank will be oscillated to project the pin 62 into the path of the cam 64, and said pin and cam 64 have beveled faces 73 and 74, which fit snugly together when the pin is projected into the path of the cam, so that when the pin is moved away from the finger 67 it will still remain in engagement with the cam until the latter reaches that part of its stroke where it separates itself from the pin. The pin upon being released from the cam will be retracted, and the mechanism hereinafter described will return the arm 60 to its normal position. The bell-crank during the time the pin is in engagement with the cam 64 will remain in the position shown in Fig. 8, the turnstile having stopped in that position, with the finger 67 advanced to the limit of its movement toward said cam In this position the finger will be directly in the path of the pin as it is returned on the upstroke of the arm 60, and to prevent damage to the mechanism I prefer to provide a pivoted latch 75 on the end of the pin yieldingly held toward the finger by a spring 76, Figs. 8, 9, 10, and 11. This latch projects beyond the end of the pin and engages the finger on the up or return movement of the arm 60 and yields upon such engagement to allow the finger when the bell-crank is oscillated to engage the end of the pin, as shown in Fig. 9. A sack carried along by the conveyer engages one of the arms 72 and moves the turnstile one step. This movement oscillates the bell-crank, projects the pin 62 into the path of the cam 64, causes the depression of the arm 60, raises the hook 59 to allow the driving-shaft clutch to lock itself thereon, and depresses the hook 58 to unlock the feed-shaft clutch and allow the feed-shaft to run without operating the shaft 20 or the conveyer on which the sacks are placed When movement of the conveyer ceases, the sack will be opposite a certain predetermined point on the machine where it is in position to be engaged by the folding means, which make a vertical fold in the top of the sack preparatory to putting the fastening device thereon.

*The folding mechanism.*—Above the driving-shaft is a cam-shaft 77, provided with a sprocket 78, connected by a chain 79 with a sprocket 80 on the loosely-mounted member 49 of the driving-shaft clutch, Figs. 1, 3, 5, and 6. This sprocket 80 will be locked on the driving-shaft with the movable member of the clutch in the manner heretofore described, and simultaneously with the stopping of the feed mechanism the operation of the cam-shaft will begin. At each end of the cam-shaft I provide cams 81 and forks 82, embracing the same and provided with rods 83, which extend across the machine and are pivotally connected to short arms 84, that are secured on a rock-shaft 85, mounted in bearings at the front of the machine, Figs. 1, 2, 3, and 4. This shaft is supported in an upper part of the frame ends that overhang the conveyer-belt and is provided with fixed arms 86, arranged upon each side of the middle portion thereof and projecting outwardly and supporting a bar 87 at their outer ends, Figs. 1, 20, and 21. When the shaft 85 is rocked, this bar is reciprocated toward and from the frame of the machine, and between the bar and the frame the open end of the sack enters and is moved along until the sack engages and operates the turnstile, as indicated by dotted lines in Fig. 5. The shaft 85 is also provided with sliding arms 88, that are adapted to move longitudinally thereon and have ends 89, that are bent partially around the bar 87, but slide freely thereon. This partial bend of the ends 89 around the bar 87 causes the arms 88 to turn with the rock-shaft, while allowing them to slide freely thereon, Figs. 1, 2, 20, and 21. Each arm 88 is provided near the bar 87 with a plate 90, having a longitudinal centrally-arranged slot 91 and a concave end face 91', Figs. 20, 21ª, 26, and 27, which when the arms are moved toward each other on the rock-shaft will cooperate to engage the walls of the sack at the open end thereof and gather the same up in vertical folds. The cams 81 are so arranged that the inward swinging movement of the bar 87 will precede the sliding movement of the arms 88, and consequently the open end of the sack will be flattened and the space between the bar and the frame contracted to substantially the width of the sack-folders 90 before said folders begin their movement toward each other to form the vertical folds in the sack, Fig. 27.

I operate the arms 88 by means of cross-heads 92, that are loosely mounted on the shaft 85 and also on a fixed parallel shaft 93 above the shaft 85. These cross-heads are provided with hooks 94, that enter annular grooves 95 in the hubs of the arms 88 and advance said arms and withdraw them to their normal separated position after the folding operation has been completed. I reciprocate the cross-heads 92 by means of links 96, pivotally connected to cranks 97 on shafts 98, mounted in brackets 99 on the machine-frame, Fig. 1. These shafts are provided with pinions 100, that engage beveled gears 101, secured on the cam-shaft 77. The revolution of the cam-shaft will revolve the shafts 98, oscillate the cranks 97, and reciprocate the heads 92, and with them the arms 88 and the sack-folding devices carried thereby.

I provide strong coil-springs 102, that are connected to the machine-frame and to arms 103, secured on the rods 83. The forward movement of the rods 83, actuated by their cams, will place the springs under tension, so that after the cams have performed their function and released the forks 82 the springs will return the rods 83 and the mechanism connected therewith to their normal position. Each revolution of the cam-shaft will cause a complete operation of the sack-folders, moving them to the limit of their travel toward each other and returning them to their normal position, and preceding the sliding movement of said folders the bar 87 is swung in toward the frame to flatten the top of the sack and bring the sack-folders to their proper operative position, after which the folders are moved toward each other to gather and fold the sack preparatory to placing the clamp or fastener thereon.

*The clamp-forming head.*—104 represents a breastplate mounted on the machine-frame and whereon the clamp-forming head and the clamp-folders are supported. 105 is a block secured to said plate by screws or bolts and having a guideway 106, whereon a cross-head 107 is slidable, Figs. 22 and 23. This cross-head is reciprocated in the guideway by means of a swinging arm 108, that is pivoted at a point intermediate to its ends near the inner edge of the plate 104 and has a slot 109 in its outer end through which a screw 110 passes into said cross-head. The opposite end of said arm is provided with a head 111, that is engaged by a zigzag cam 112, secured on the cam-shaft 77, Fig. 1. The revolution of this shaft and the movement of said cam will oscillate the arm 108 and cause the reciprocation of the cross-head in its guideway.

The cross-head is provided with a shoulder or lip 113, between which and a pawl 114 the thin strip of metal 115, from which the clamps are made, is fed, and said pawl is normally held in engagement with said strip by a spring 116, Fig. 22. The ribbon 115 is wound on a spool 117, that is mounted on the machine-frame conveniently near the clamp-making head. As the cross-head 107 is drawn back away from the head the pawl 114 will slip over the ribbon, and when the head is moved in the opposite direction the pawl will engage the ribbon and feed it forward into the head. I provide a shoulder 118 on the block 105, between which and a pawl 119 the severed end of the ribbon is held, while the cross-head is being drawn back to make the feed for the next clamp. A spring 120 engages the pawl 119 and holds the same in yielding engagement with the severed end of the ribbon. To regulate the length of the clamp that is fed into the head, I provide a plate 121, having a slot 122 to receive screws 123, by means of which said plate is adjustably secured on the block 105 near the outer end of the guideway. The plate is slightly curved, as shown in Fig. 22, and forms a bearing-surface for the ribbon, and the inner end of the plate is in position to engage the pawl 114 when the cross-head 107 approaches the limit of its outward movement. On the return movement of the cross-head the pawl 114 will engage the ribbon at the end of the plate 121, and the length of the clamp fed into the head will correspond to the distance from the inner end of the plate 121 to the point where the pawl 114 ceases its inward movement. The ribbon is fed edgewise into the head, passing between a plate 124, secured to the under side of the block 125, that is supported at one side on the block 105 and on the other side upon posts 126, an open space 127 being provided beneath the block 125, into which the completed clamp drops and is engaged by the clamp-folding devices, Fig. 23. A fixed knife 128 is provided opposite the plate 124, having a slot 129 to receive screws 130, by means of which the knife is adjustably secured on the block 125. This knife has a cutting edge 131, that coöperates with a semicylindrical rotating knife 132, integrally formed on the lower end of a stud 133. The flat edge of this knife moving past the cutting edge 121 as the stud 133 is rotated severs the ribbon at that point when a sufficient length of the same has passed into the head to form a clamp and continuing its rotating movement after passing the fixed blade carries the end of the ribbon in front of it and bends it around a toe 134, provided on a plate 135. This toe is separated from the fixed knife 128 by a space to allow the knife 132 to turn therein, and the space is normally closed by a sliding plate 136, that is yieldingly held toward the ribbon by a spring 137, Fig. 24. I provide this plate 136 to prevent any possibility of the end of the ribbon when it enters the head from catching on the toe 134 and clogging the mechanism. The ribbon as it enters the head will slide in a narrow groove 138 between the plates heretofore described, and a similar guide-plate 139 until it reaches the opposite end of the head, where I provide a plate 140, which engages the end of the ribbon and arrests further movement of the same, and has a chamber 141, wherein a rotary knife is provided corresponding to the one heretofore described and mounted on a stud $133^\times$, similar to the stud 133, Figs. 23 and 25. A toe $134^\times$ is also provided on the plate 124, projecting into the chamber 141, around which the inner end of the ribbon is bent in the opposite direction from the outer end by the partial revolution of the semicylindrical knife. The said studs are mounted in upright bearings in the block 125 and each are provided with gears 142 $142^\times$, secured thereon, the upper ends of said studs above said gears being held in place by a yoke 143, that is secured to the block 125 by a screw-bolt 144. Between the gears 142 and guides 145 on the clamp-forming head I provide a rack-bar 146, that is pivotally connected at one end to a link 147, Fig. 25, which in turn is pivoted to a bar similar to the bar $108^\times$, pivoted in the same manner and arranged to engage a zigzag cam 148, secured on the cam-shaft, Fig. 1. The last-named bar $108^\times$ is pivoted on a higher plane than the one corresponding thereto on the opposite side of the clamp-forming head and when oscillated by the revolution of the cam-shaft will reciprocate the rack-bar 146, revolve the studs, and cause the knives at the lower ends of said studs to cut off a length of the ribbon, bend the ends thereof in the opposite directions to form the hooks, which when interlocked and pressed together will close the folded mouth of the sack and fasten the same securely.

Secured to the under side of the clamping-head are depending clips 149 and 150 upon each side of the groove or slot 138 and extending to a point near the surface of the plate 104 to act as guides for the finished clamp and prevent it from tipping over flatwise when it is discharged from the head, Figs. 18 and 19. The block 104 is provided with slots 151 at each end of the plate 139 to receive the outer ends of arms 152, pivoted on brackets 153 on the head or block 125, and carrying a roller 154 at their inner ends, which is of sufficient weight to normally hold the outer ends of the arms elevated and within the slots 151, Figs. 18, 19, and 23. When said outer ends are depressed, they will engage the upper edge of the finished clamp and push it out of the head down between the guide-clips upon the plate 104.

*The clamp-folding mechanism.*—This part of the machine is shown in detail in Figs. 26 and 33 and consists of a horizontally-reciprocating plunger 155, having in its under surface a dovetailed groove 156 to receive a correspondingly-shaped rib 157, provided on the plate 104 parallel with and substantially midway between guides $157^\times$. The forward end of the plunger has a recessed or concave face 158, that engages the middle portion of the clamp as it lies on edge midway between the guides $157^\times$ and pushes the same toward the folded top of the sack and coöperating with the folds in the walls of the sack forms the bend in the middle of the clamp prior to the operation of locking its ends together. The rear end of the plunger is adjustably connected by a rod 159 with a fork 160, having a roller 161, which travels in a cam-track 162, provided on a covered cam 163, that is secured on the cam-shaft. The plunger is also provided near its forward end with a block 164, having an inclined forward face 165, which engages the roller 154, elevates the same, and depresses the outer ends of the arms 152 to push the finished clamp out of the head. A curved sheet-metal guide-plate 166 is secured on the block 164, within which the roller 154 moves, and the upper portion of said guide engaging said roller serves to depress the same and insure the return of the forward ends of the arms 152 into the slots 151 after they have discharged a finished clamp and before the entrance of the ribbon into the head from which the succeeding clamp is to be formed. Upon each side of the plunger I provide bars 167, having dovetailed grooves to receive ribs corresponding to the one heretofore described with reference to the plunger and also having ribs 168 on their outer edges to enter rabbeted edges of rack-bars 169, that are provided between the bars 167 and the guides $157^\times$ and are slidable independently thereof. The inner ends of these rack-bars are secured to rods 170, that are connected to forks 171, that have rollers 172, adapted to travel in cam-grooves 173 on the cams 174, secured to the cam-shaft upon each side of the cam 163. Upon the bars 167 I secure blocks 175, which lap over both the plunger and the rack-bars and have holes through which the rods 170 extend and wherein they are freely slidable. Springs 176 on said rods normally hold the bars 175 in their forward position and within certain limits movement of the rack-bars will produce a corresponding movement of the bars 167, Fig. 26.

The outer ends of the bars 169 are provided with racks 177, that engage sector-gears 178, provided on the cam-folders 179 and 180, that have sockets wherein tongues on the ends of the bars 167 are pivoted, Fig. 31, and both folders have curved arms 181 to engage the ends of the clamp and bend the same around the folded mouth of the sack, and the folder 180 has a slot 182 in its end through which the clenching-hammer operates during the operation of fastening the hooked ends of the clamp together. The cams for operating the plunger and bars are so arranged that the plunger will move in advance of the folders and engage and bend the middle portion of the clamp and hold it while the rack-bars are operating the folders to complete the adjustment of the clamp on the sack. The blocks 175 will slide over the plunger and engaging the block 164 when at the limit of its forward movement will arrest forther movement of the bars 167 and the continued movement of the cams 174 will press the rack-bars forward against the tension of their springs into the slots 91 in the folders 90, Figs. 19, 28, 29, and 30, oscillate the folders 179 and 180 on their pivots within said slots, Fig. 21$^a$, and bend the ends of the clamp around the folded mouth of the sack until the two hooks interlock, as shown in Figs. 28, 29, 30, and 25. As soon as the ends of the clamp have become interlocked the plunger and the bars will be withdrawn to their normal position, leaving an unobstructed space at the forward end of the guideway for the reception of the next clamp.

*The clenching mechanism.*—After interlocking the bent or hooked ends of the clamp or fastener it is essential to provide means for pressing said ends together to hold them securely and prevent their accidental disengagement from each other. I therefore provide a hook 183, pivoted on the bar 87 and having an end 184, that is adapted to press on the folded end of the sack and be clasped between it and the ends of the clamp. (See Figs. 18, 19, 34, and 35.) Upon the rock-shaft 85 I loosely mount an arm 185 between collars 186 and provide a pin 187 at the outer end of said arm that is threaded, as shown, (see Figs. 34 and 35,) to enter a threaded socket in said arm and be adjustably secured therein by a lock-nut 188. The opposite end of said arm is provided with an extension 189, that is pivotally connected by a rod 190 with a fork 191, provided with a roller to travel in a track in a cam 192, secured on the cam-shaft. This fork and cam correspond to those heretofore described and shown in detail in Fig. 29, and it is not thought necessary to illustrate the same herein except in a general view. Movement of the fork 191 will cause the reciprocation of the arm 185 and swing the end of the pin 187 through a slot 193 in the bar 87 and drive the end of said pin against the hooked ends of the clamp, pressing them together, the end of the hook 183 acting as an anvil or backing to support the ends of the clamp while they are being clenched. The hook 183 is provided with a lug 194, and the arm 185 has a dog 195, pivoted thereon and held in a substantially horizontal position by a spring 196. The outer face of the lug 194 is beveled to allow the dog 195 to slip easily over the same when the arm 185 is swung in to clench the clamp. As soon, however, as the clenching operation is completed and the arm begins its return stroke, the dog will engage the lug, tilt the hook 183, and lift its end out from between the clenched ends of the clamp and the sack, whereupon the sack will be released and be ready to be moved forward and discharged from the machine as soon as the feed mechanism is again put in motion.

*The shifter mechanism.*—The operation of flattening the open top of the sack, gathering the same up in vertical folds, making the clamp, placing the same on the sack, and clenching the hooked ends of the clamp are all performed successively while the cam-shaft is making a single revolution—that is, with each revolution of the cam-shaft the sack is prepared for the fastener, the fastener is made and secured, and the sack is ready to be discharged from the machine. During the time that the fastener is being formed and secured on the sack the sack of course is stationary, resting upon the endless conveyer, which with the feed mechanism has been rendered inoperative by the mechanism heretofore described. As soon, however, as the clamp has been secured on the sack it is desirable to again start the feed to move the sack away from the clamp making and folding mechanism to allow another sack to take its place. I therefore provide an arm 197, secured on the shaft 57, that is provided with a socket for a sliding pin 199, that is substantially parallel with the cam-shaft and is normally projected into the path of a cam 200 on said shaft by a spring 201, Figs. 1, 36, 37, and 38. One end of the pin 199 is adapted to bear on the face of said cam and slide over the same as the cam-shaft is revolved. The inclination of the cam 200 is such that as it revolves it forces the pin 199 lengthwise in its socket against the tension of the spring 201 until said pin passes a shoulder 202 on said cam, when it flies back to its normal position. The end of said pin opposite the part that engages the cam 200 is provided with a head 203, having a beveled face 204, that is adapted to fit snugly against a corresponding face on a cam 205, that is also secured on the cam-shaft. As the pin slides over the cam 200 the head 203 is moved into the path of the cam 205 and engaging the same the arm 197 is oscillated, rocking the shaft 57 and reversing the movements of the hooks 58 and 59 from that caused by the oscillation of the arm 60. This movement of the arm 197 does not take place until the cam-shaft has nearly completed its revolution, so that the driving-shaft clutch will be unlocked and the feed-shaft clutch locked, the movement of the folding mechanism arrested, and the feed mechanism again set in motion just at the moment the cam-shaft completes its revolution. As soon as the arm 197 has been moved sufficiently to cause the release of one clutch and the locking of the other the pin 199 will pass off the shoulder of its cam 200, and the head having passed out of contact with the cam 205 the spring 201 will return the pin 199 to its normal position ready to be again projected upon the next revolution of the cam-shaft.

The operation, briefly, of the machine is as follows: The operator having placed a sack upon the receiving end of the conveyer-belt power will be applied to the driving-shaft and the feed mechanism will be set in motion to move the sack toward the place where the fastener device is applied. The sack will be leaned slightly toward the machine, the upper portion bearing against the sprocket-chain, and as the sack approaches the folding mechanism its top will be engaged by the short sprocket-chain and directed into the space in front of the folders, which overhang the middle portion of the conveyer and the shoulder at the top of the sack. As soon as the sack engages and moves the turnstile the shaft 57 will be rocked, oscillating the hooks 58 and 59 to release the clutch member and pinion on the feed-shaft and lock the corresponding clutch member and gear on the cam-shaft, and the feed mechanism will instantly stop and the revolution of the cam-shaft begin. The initial movement of the cam-shaft will rock the shaft 85 and swing the bar 87 in against the top of the sack, flattening the same, as shown in Fig. 27. Simultaneously with the movement of the bar 87 the sack-folders will be moved toward each other, and when the top of the sack has been flattened so that it will correspond substantially in width to that of the folders it will be engaged at the sides by the sack-folders and the walls gathered into vertical folds, as shown in Figs. 28, 29, and 30. During the time that the top of the sack is being flattened and folded the metal ribbon will be fed into the clamp-forming head, a piece of the required length cut off, the ends bent in opposite directions, and the completed clamp or fastener dropped down upon the breast-plate in front of the reciprocating clamp-folders. The hollow-faced plunger will be moved forward simultaneously and in advance of the rack-bars and the oscillating folders and will engage the middle portion of the clamp or fastener, push it against the folded top of the sack, and bend its middle around the same. At this time the forwardly-moving bars 167 will be stopped by the engagement of the blocks 175 with the blocks 164 on the plunger, and the rack-bars continuing their forward movement will engage the oscillating folders 179 and 180, whose arms will inclose the ends of the clamp and press or bend them around the folded portion of the sack. The arm 181 is arranged to move ahead of the opposite arm to fold or bend its end of the clamp around the sack and in place to receive the slower-moving opposite end. These ends will interlock when brought together, as shown in Fig. 29, and when interlocked the clenching mechanism is operated to press the hooked ends together and prevent their accidental disengagement. As soon as the clenching operation is completed the hammer will be withdrawn, the hook that forms the anvil pulled out from between the clenched ends of the clamp and the sack, the folders will be retracted and the mechanism returned to its normal position, and at this time the cam-shaft will have completed its revolution and the shifter mechanism will operate to unlock the clutch on the cam-shaft and lock the corresponding clutch on the feed-shaft. The conveyer-belt will again be set in motion, and the sack, closed and secured, will be moved away from the folding and fastening mechanism to make room for the succeeding sack, which engaging the turnstile will stop the feed, start the cam-shaft, and repeat the operation as before.

I claim as my invention—

1. The combination, with a sack-conveyer, of means for folding the top of the sack vertically and fastening the same, a driven shaft, independently-operable mechanisms connecting said driven shaft with said conveyer and with said folding and fastening means, a turnstile operated by the movement of the sack, and a mechanism actuated by the movement of the turnstile for stopping said conveyer-operating mechanism and starting said folding and fastening mechanism.

2. The combination, with a sack-conveyer, of means for flattening the top of a sack and gathering it into a substantially circular form, mechanism for placing a fastener on the sack, and mechanism actuated by the movement of the sack for stopping said conveyer and starting said fastening mechanism.

3. The combination, with a sack-conveyer, of means for folding the top of the sack vertically and securing the same, a drive-shaft, independently-operable mechanisms connecting said drive-shaft with said conveyer and with said folding and fastening means, a turnstile operated by the movement of the sack, and suitable clutch-controlling mechanisms operated by the movement of the turnstile for stopping said conveyer-operating mechanism and starting said folding and fastening mechanism.

4. The combination, with a suitable conveyer whereon the sacks are placed, of means for flattening and folding vertically the open top of the sack, a drive-shaft, a feed-shaft continuously driven therefrom, clutches provided on said drive and feed shafts, suitable driving connections provided between said feed-shaft clutch and said conveyer, a cam-shaft connected with the clutch on said drive-shaft, suitable mechanisms provided between said cam-shaft and said folding and fastening means, and means actuated by the moving sack for unlocking said feed-shaft clutch and locking said drive-shaft clutch when the sack is opposite said folding and fastening mechanisms.

5. The combination, with a suitable conveyer whereon the sacks are placed in an upright position, of a mechanism for folding the top of the sack vertically and gathering the same to close the top thereof, a drive-shaft, a feed-shaft driven continuously thereby, clutch mechanisms provided on said drive and feed shafts, suitable gearing connecting said feed-shaft clutch with said conveyer for operating the same, a cam-shaft connected with said drive-shaft clutch and inoperative when said conveyer is in motion, suitable mechanisms connecting said cam-shaft and said folding and fastening means, a turnstile provided in the path of the sacks carried along by said conveyer to be actuated thereby, and a suitable mechanism operated by said turnstile for releasing said feed-shaft clutch to stop said conveyer and lock said drive-shaft clutch to start said cam-shaft.

6. The combination, with a suitable conveyer, of means for folding the top of the sack and securing the same, a drive-shaft, a feed-shaft driven therefrom, clutch mechanisms provided on said drive and feed shafts, suitable gearing connecting said feed-shaft clutch and said conveyer, a cam-shaft connected with said drive-shaft clutch and also with said folding and fastening mechanisms to operate the same, means operated by the sack carried along by said conveyer, a mechanism connected with said sack-operated means for releasing said feed-shaft clutch and locking said drive-shaft clutch, and a shifter mechanism for reversing the movement of said clutch-releasing mechanism when said cam-shaft completes its revolution.

7. The combination, with a suitable conveyer whereon the sacks are placed, of a folding and fastening mechanism arranged to make a vertical fold in the top of the sack and secure the same, a drive-shaft, a feed-shaft driven therefrom, clutch devices provided on said drive and said feed shafts, suitable gearing connecting said feed-shaft clutch with said conveyer, a cam-shaft driven from said drive-shaft clutch and having suitable connections with said folding and fastening devices, a turnstile operated by the moving sack, a mechanism operated by the movement of said turnstile for releasing the clutch on said feed-shaft and locking the corresponding clutch on said drive-shaft, and a shifter mechanism arranged to reverse the movement of said turnstile-operated mechanism and operate said clutch devices to start said feed-shaft and stop said cam-shaft when the latter has completed its revolution.

8. The combination, with a drive-shaft, of a feed-shaft driven therefrom, clutches provided on said drive and feed shafts, a shaft 57 provided between said drive and feed shafts, oppositely-extending hooks provided on said shaft 57, an arm 60 secured on said shaft 57, a yieldingly-held pin carried by said arm, a cam provided on said feed-shaft and arranged to engage said pin when projected, a bell-crank having one arm normally in engagement with said pin, and a turnstile having a cam arranged to engage the other arm of said bell-crank.

9. In a machine of the class described, the combination, of mechanism for gathering and compressing the top of a sack, with mechanism adapted to fold a fastener around said top and interlock its ends on the side of the sack opposite from the normal inoperative position of said folding mechanism.

10. In a machine of the class described, the combination, of means for flattening the top of a sack, with means operating substantially at right angles to said flattening means and adapted to gather the edges of the top when flattened and compress them into a circular form, substantially as described.

11. In a machine of the class described, the combination, with a suitable support, of sliding folders having concave faces adapted to engage the open top of a sack and close and compress it into a substantially circular form, and means for operating said folders.

12. In a machine of the class described, the combination, with a sack-conveyer, of means actuated by the moving sack for stopping said conveyer at a certain predetermined point, and sack-folders having concave faces arranged to clasp and compress the open end of the sack upon the stopping of said conveyer.

13. The combination, with a suitable frame, of a swinging bar between which and said frame the sack to be closed is moved, said bar engaging and flattening the open top of the sack, and sack-folders arranged to clasp the flattened edges of the sack and fold the same vertically.

14. The combination, with a suitable frame, of a swinging bar between which and said frame the sack to be closed is moved, said bar engaging and flattening the open top of the sack, and sack-folders slidably supported upon said bar and adapted when moved toward each other to clasp the flattened edges of the sack and fold the same vertically.

15. The combination, with a suitable frame, of a conveyer whereon the sacks to be closed and fastened are placed, means for operating said conveyer, means actuated by the moving sack for stopping said conveyer at a certian predetermined point, a reciprocating bar for flattening the open top of the sack, sliding folders carried by said bar and arranged to engage the top of the sack and make a vertical fold therein, and mechanism coöperating with said folders to clasp a metallic band or fastener around said vertical fold to close and secure the mouth of the sack.

16. The combination, with a suitable frame, of a conveyer whereon the filled sacks are placed, a drive-shaft, a feed-shaft driven continuously therefrom, clutches provided on said feed and drive shafts, a cam-shaft, operative connections provided between said conveyer and said feed-shaft clutch and said cam-shaft and said drive-shaft clutch, a rock-shaft operatively connected with said cam-shaft, a swinging bar carried by said rock-shaft and arranged to engage and flatten the top of a sack, folder-arms also connected with said cam-shaft for making a vertical fold in the top of the sack, and means actuated by the moving sack for operating said clutches to stop said conveyer and start said cam-shaft.

17. In a machine of the class described, the combination, of sack-folders adapted to engage and make a vertical fold in the top of a sack, said folders operating in a substantially horizontal plane and provided with concave sack-engaging faces, for the purpose specified.

18. In a machine of the class described, the combination of an oscillating bar for engaging and flattening the top of the sack, and a rock-shaft whereon said bar is supported, with sack-folders slidably arranged on said bar, and means for swinging said bar to flatten the sack and sliding said folders toward each other simultaneously.

19. In a machine of the class described, the combination, with a suitable frame, of mechanism mounted thereon and arranged to gather the top of a sack and close its mouth, mechanism for forming hooked ends on a metallic ribbon, and mechanism for bending said ribbon around the closed mouth of the sack and interlocking said hooked ends, substantially as described.

20. In a machine of the class described, the combination, with means for closing the top of a sack, of pivoted folders arranged to bend a clamp or fastener around said closed top and secure its ends together, substantially as described.

21. In a machine of the class described, the combination of mechanism for vertically folding the top of a sack, with mechanism for pressing a metallic ribbon against the folded portion of said sack, and mechanism for bending the ends of said ribbon around said folded portion and interlocking them on the side of the sack opposite from the normal position of said bending mechanism.

22. In a machine of the class described, the combination of mechanism for vertically folding the top of a sack, with mechanism for pressing the middle portion of a metallic ribbon having hooked ends against the folded part of the sack, mechanism for bending said hooked ends around said folded part and interlocking them, and mechanism for pressing said interlocked ends together.

23. In a machine of the class described, the combination of means for vertically folding the top of the sack, with means for bending the ends of a flexible metallic strip in opposite directions to form hooks thereon, means for pressing the middle portion of said strip against the folded portion of said sack, and means for bending the ends of said strip around the sack and interlocking said hooks.

24. The combination in a machine of the class described, with means for making a vertical fold in the top of the sack, of means for severing a metallic strip of sufficient length to clasp the fold of the sack, and forming hooks on the ends of said strip, means for pressing the middle portion of said strip against the folded portion of the sack, and means for bending the hooked ends of said strip around said folded portion and interlocking them.

25. A machine of the class described having slotted sack-folders arranged to engage and fold the mouth of a sack vertically, a plunger adapted to engage a metallic fastener having oppositely-turned ends and press the middle portion of the same against the sack, and pivoted folder-arms arranged to enter the slots in said sack-folders and bend the hooked ends of the fastener around the sack and interlock said ends.

26. A machine of the class described having reciprocating sack-folders having central longitudinal slots and concave end faces, a plunger having a concave end face and operating substantially at right angle to the said folders, reciprocating bars provided upon each side of said plunger, oscillating folders mounted on said bars, means for projecting said folders into the slots in said sack-folders, and means for swinging said oscillating folders, substantially as described.

27. In a machine of the class described, the combination, of mechanism for gathering and folding vertically the top of a sack, with mechanism for forming a clamp or fastener, and pivoted folders having an oscillating movement to bend said fastener around the closed mouth of the sack, and a reciprocating movement toward and from said sack-gathering mechanism.

28. In a machine of the class described, the combination, of mechanism for gathering and folding the top of a sack, with means having a reciprocating movement toward and from said sack-folding mechanism to bend a metallic fastener around said sack, and means operating between said reciprocating means for gripping the fastener during the bending operation, substantially as described.

29. In a machine of the class described, the combination, with a suitable frame, of mechanism for closing the mouth of a sack, mechanism for placing a fastener on the sack, and mechanism actuated by the delivery of the sack to said closing mechanism for starting said fastening mechanism, substantially as described.

30. In a machine of the class described, the combination of mechanism for vertically folding the top of a sack, with mechanism for bending a metallic clasp or fastener having hooked ends around the folded portion of said sack and interlocking said hooked ends, and mechanism for clenching said hooked ends.

31. In a machine of the class described, the combination, of means for pressing a metallic ribbon or band having oppositely-turned hooked ends against the vertically-folded top of the sack, with means for bending said ribbon around the sack and interlocking its hooked ends, a pivoted anvil device around which the ends of said ribbon are passed and a clenching-hammer arranged to press said interlocked ends against said anvil.

32. In a machine of the class described, the combination of means for bending a metallic ribbon having oppositely-turned ends around the gathered or vertically-folded mouth of a sack, with an anvil device between said interlocked ends and said sack, and a clenching device arranged to engage and press said interlocked ends against said anvil.

33. In a machine of the class described, the combination of means for folding a metallic clip or fastener having oppositely-turned ends around the gathered or vertically-folded mouth of a sack and interlocking said ends, with a pivoted hook device having a point around which said fastener is passed beneath said interlocked ends against the point of said hooks and clenching the same, and a trip for tilting said hook and disengaging its point from between the fastener and the sack.

34. In a machine of the class described, the combination, with means for placing a metallic fastener having hooked ends upon the vertically-folded mouth of a sack, of a pivoted hook 183 having a point around which the fastener is passed, said hook being opposite the point where the ends of the fastener are interlocked and beneath the same, an adjustable pin having a point to engage the ends of the fastener and clench them against said hook, a swinging arm whereon said pin is supported, and a trip device for tilting said hook to remove it from between said fastener and sack.

35. In a machine of the class described, the combination, with the sack-folders, of a reciprocating plunger, reciprocating bars provided on each side of the same, pivoted folders mounted on said bars, means for reciprocating said bars and oscillating said folders, one of said folders having a slotted end, an anvil provided between said oscillating folders, and a hammer operating through said slotted end.

36. In a machine of the class described, the combination, of a sack-conveyer with gathering devices operating in a substantially horizontal plane and having concave sack-engaging faces, substantially as described.

37. In a machine of the class described, gathering devices having slotted concave faces adapted to compress the top of a sack into a circular form, in combination with folders operating through the slots in said faces.

38. In a machine of the class described, gathering devices having concave faces arranged to compress the top of a sack into a circular form, in combination with mechanism adapted to place a fastener around the compressed portion of the sack between the said compressed portion and said concave faces.

39. In a machine of the class described, the combination, of gathering devices operating in a substantially horizontal plane and having concave faces, with mechanism for placing a fastener having hooked ends around the compressed portion of the sack between said compressed portion and said faces.

40. In a machine of the class described, the combination, of gathering devices adapted to compress the top of a sack and having slotted faces, with folders operating through said slotted faces and adapted to place a fastener around the closed top of a sack, substantially as described.

41. In a machine of the class described, the combination, with means for gathering the top of a sack to close the same, of reciprocating folders arranged to engage the ends of a fastener and bend them around the closed portion of said sack, substantially as described.

42. In a machine of the class described, in combination, mechanism for forming hooked ends on a piece of metal, mechanism for closing the mouth of a sack, a folding device for bending said hooked ends of said strip of metal around said closed mouth of a sack and interlocking them, and a plunger device operating between said folding devices.

43. In a machine of the class described, means for gathering the mouth of a sack in combination, with mechanism for forming hooked ends on a strip of metal, reciprocating folders engaging said ends, and a plunger adapted to operate between said folders.

44. In a machine of the class described, means for gathering the mouth of a sack in combination, with mechanism for forming hooked ends on a metallic ribbon, means for bending said ends around the closed mouth of a sack and interlocking them, and means for clenching said interlocked ends.

45. In a machine of the class described, means for gathering the mouth of a sack and means for forming oppositely-turned hooked ends on a strip of metal, in combination with folding devices adapted to engage said ends, and a clenching device operating between said folders.

46. In a machine of the class described, means for gripping the top of a sack and compressing it into a substantially circular form, in combination with pivoted folders operating through said gripping means for folding a fastening device around the closed top of the sack and interlocking its ends on the side of the sack opposite from said folders.

47. In a machine of the class described, the combination, with mechanism for closing the top of a sack and gripping the same, of mechanism operating through said gripping means to place a fastener around the closed portion of said sack.

48. In a machine of the class described, means for flattening the open top of a sack, means having slotted concave faces arranged to engage the edges of said flattened top and compress the same into a circular form, in combination with a mechanism for forming hooked ends on a strip of metal, folders adapted to operate through said slotted faces and engage said hooked ends, and means operating between said folders to hold said metal strip against the sack during the folding operation.

49. In a machine of the class described, the combination, with reciprocating supports, of pivoted folders mounted thereon, and means for oscillating said folders when near the limit of their reciprocating movement in one direction.

50. In a machine of the class described, the combination, with means for closing the mouth of a sack, of pivoted folders having a reciprocating movement toward and from said sack-closing means, and means for swinging said folders on their pivots toward one another when near said sack-closing means to fold and clamp a fastener around the closed portion of the sack.

51. In a machine of the class described, the combination, with means for closing the mouth of a sack and gripping the same, with a plate adapted to support a metallic fastener having oppositely-turned hooked ends, and means for pushing said fastener against the closed portion of the sack and bending its ends around said closed portion and interlocking them, substantially as described.

52. The combination, with a sack-support, of means for closing the mouth of the sack and gripping the same, and means operating through said gripping means for placing a fastener around the gripped portion of the sack, substantially as described.

53. In a machine of the class described, the combination, with means for closing the top of a sack and gripping the same, of oscillating folders, a reciprocating support whereon said folders are mounted, mechanism for operating said support, and mechanism for oscillating said folders when they have been moved by said support to a point near said closing means, substantially as described.

54. In a machine of the class described, the combination of mechanism for closing the top of a sack, with mechanism for pressing the middle portion of a metallic ribbon against the closed top of a sack, oscillating folders, a reciprocating support whereon said folders are mounted, mechanism for operating said support, and mechanism for oscillating said folders, substantially as described.

55. In a machine of the class described, the combination, of a suitable frame, a plate thereon adapted to support a metallic ribbon having oppositely-turned hooked ends, a sack-support provided near said plate, and mechanism for folding the ends of said ribbon around the closed mouth of the sack and interlocking them, substantially as described.

56. In a machine of the class described, the combination, with a suitable frame provided with a sack-support, of mechanism for forming hooked ends on a metallic ribbon in combination with mechanism for bending said ribbon around the closed mouth of the sack and interlocking said ends, substantially as described.

57. In a sack-closing machine, the combination, of means for gathering the mouth of a sack, with mechanism adapted to form oppositely-turned ends on a strip of metal, and folding devices adapted to engage said ends and bend them around the gathered mouth of the sack, substantially as described.

58. In a machine of the class described, the combination of mechanism having slotted faces for gripping and closing the mouth of a sack, with curved reciprocating folders operating through said slotted faces to bend a fastener around the closed top of a sack.

59. In a machine of the class described, mechanism arranged to engage and close the mouth of a sack, in combination with a folding mechanism, a reciprocating support whereon said folders are pivoted, and mechanism for oscillating said folding mechanism independently of their movement with said support.

60. In a machine of the class described, the combination of mechanism for gripping the closed top of a sack, with mechanism for forming hooked ends on a strip of metal, and a mechanism operating through said gripping means for folding said strip of metal around the closed top of a sack and interlocking its ends.

61. In a machine of the class described, means for gathering the top of a sack, in combination with mechanism for folding the hooked ends of a fastener around the closed top of a sack, an oscillating anvil device adapted to slip between said ends and said closed top, and a reciprocating hammer.

In witness whereof I have hereunto set my hand this 12th day of June, 1903.

EDWIN G. STAUDE.

In presence of—
RICHARD PAUL,
C. G. HANSON.